US012615153B2

(12) United States Patent
Doshi et al.

(10) Patent No.: US 12,615,153 B2
(45) Date of Patent: Apr. 28, 2026

(54) METHODS, SYSTEMS, ARTICLES OF MANUFACTURE AND APPARATUS TO PROTECT DISTRIBUTED DATA

(71) Applicant: Intel Corporation, Santa Clara, CA (US)

(72) Inventors: Kshitij Arun Doshi, Tempe, AZ (US); Christian Maciocco, Portland, OR (US); Ned M. Smith, Beaverton, OR (US); Francesc Guim Bernat, Barcelona (ES); Satish Jha, Portland, OR (US); Vesh Raj Sharma Banjade, Portland, OR (US); Arvind Merwaday, Hillsboro, OR (US); S M Iftekharul Alam, Hillsboro, OR (US); Kuilin Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 730 days.

(21) Appl. No.: 17/842,982

(22) Filed: Jun. 17, 2022

(65) Prior Publication Data

US 2022/0329433 A1 Oct. 13, 2022

(51) Int. Cl.
*H04L 9/32* (2006.01)
*H04L 9/40* (2022.01)

(52) U.S. Cl.
CPC .......... *H04L 9/3226* (2013.01); *H04L 63/065* (2013.01)

(58) Field of Classification Search
CPC ............. H04L 2209/127; H04L 9/0822; H04L 9/0833; H04L 9/3247; H04L 63/0428; H04L 63/0861
See application file for complete search history.

(56) References Cited

U.S. PATENT DOCUMENTS 8,954,740 B1* 2/2015 Moscaritolo .......... H04L 63/065
                                                  380/278
2018/0270231 A1* 9/2018 Bauer ................... H04L 63/061

OTHER PUBLICATIONS

Rotem-Gal-Oz, "Fallacies of Distributed Computing Explained," retrieved from <https://arnon.me/wp-content/uploads/Files/fallacies.pdf>, Doctor Dobbs Journal, published Jan. 2008, 11 Pages.

* cited by examiner

*Primary Examiner* — Beemnet W Dada
(74) *Attorney, Agent, or Firm* — Hanley, Flight & Zimmerman, LLC

(57) ABSTRACT

Methods, apparatus, systems, and articles of manufacture are disclosed to protect distributed data. An example apparatus includes at least one memory, machine readable instructions, and processor circuitry to at least one of instantiate or execute the machine readable instructions to detect a key identifier combination from a distributed key, identify a match between the key identifier combination and a platform identifier combination, extract a second key from the distributed key, the second key associated with the object, and decrypt the object via the extracted second key.

25 Claims, 26 Drawing Sheets

| LOCATION | DEVICES/ THINGS | EDGE DEVICES | NETWORK HUB OR REGIONAL DC | CORE NETWORK | CLOUD DATA CENTER |
|---|---|---|---|---|---|
| EXAMPLE LATENCIES | (VARIES) <1 MS | <5 MS | <10-40 MS | <60 MS | ~100 MS |

| ACCESSOR | DOMAIN (e.g., TEE) | OBJECT | COROLLARY GROUP-KEY | COROLLARY (HIDDEN KEY) |
|---|---|---|---|---|
| 204 | T1 | 212 | 216 | 1010 |
| 204 | T2 | 214 | 218 | 1020 |
| 206 | T1 | 214 | 220 | 1020 |
| 208 | T3 | 212 | 222 | 1010 |
| 210 | T4 | 212 | 224 | 1010 |
| 210 | T1 | 214 | 226 | 1020 |
| ... | ... | ... | ... | ... |

550

552 — ACCESSOR B PUBLISHES A WIDE AREA REQUEST FOR K

554 — MAPPING CIRCUITRY

556 — OBJECT CACHES SERVE K TO B's MEMORY

558 — AN IBPKE SERVICE WRAPS KEY(K) WITH TEE(B→ACCEL-UNIT)

560 — ASYNCHRONOUS REVOCATIONS

562 — TEE(B→ACCEL-UNIT) UNWRAPS PROVIDED KEY X AND USES IT IN PLACE TO DECRYPT K FROM B's MEMORY WITHIN THE ACCELERATION UNIT

Figure 6:
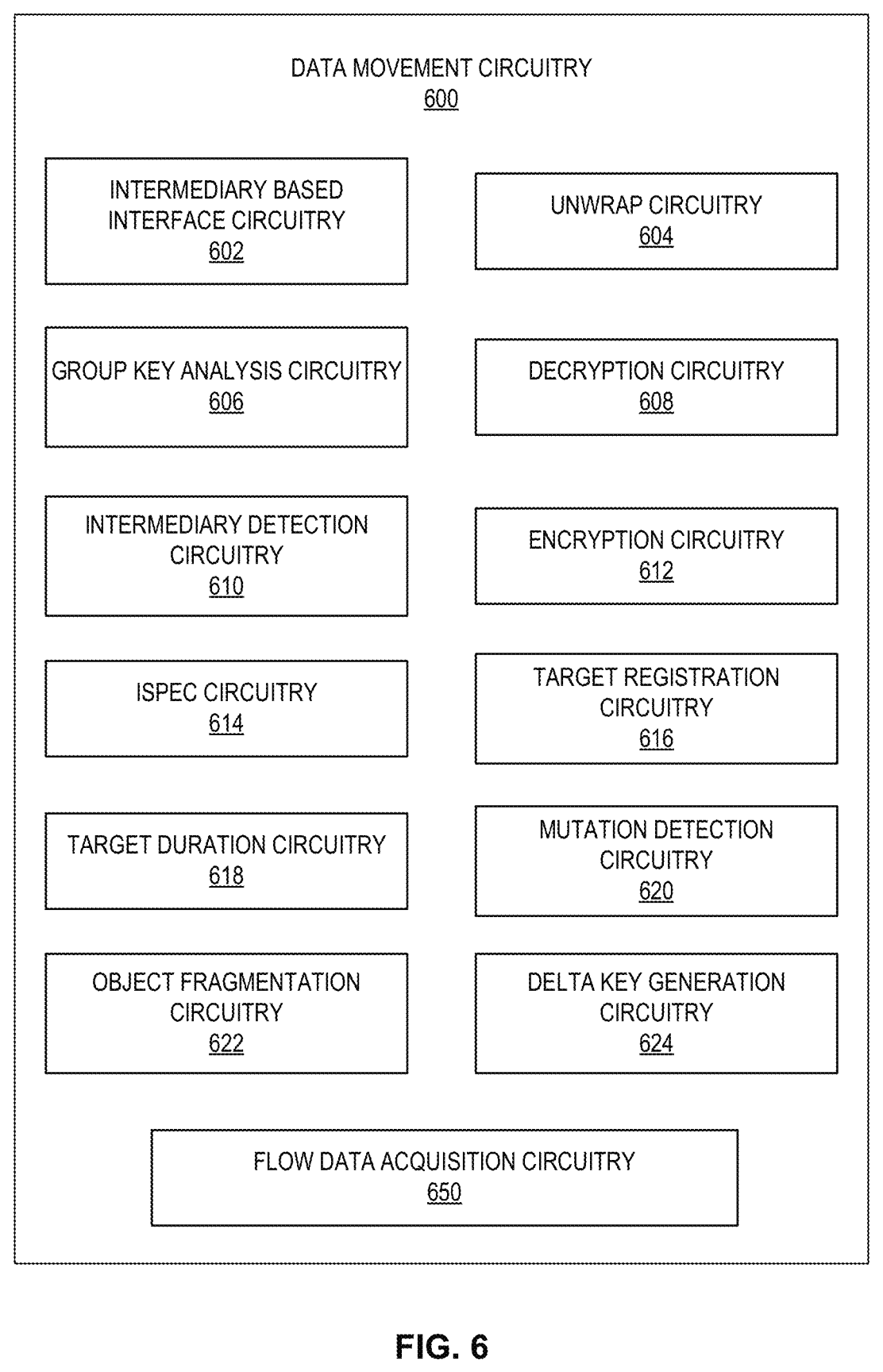

DATA MOVEMENT CIRCUITRY
600

INTERMEDIARY BASED
INTERFACE CIRCUITRY
602

UNWRAP CIRCUITRY
604

GROUP KEY ANALYSIS CIRCUITRY
606

DECRYPTION CIRCUITRY
608

INTERMEDIARY DETECTION
CIRCUITRY
610

ENCRYPTION CIRCUITRY
612

ISPEC CIRCUITRY
614

TARGET REGISTRATION
CIRCUITRY
616

TARGET DURATION CIRCUITRY
618

MUTATION DETECTION
CIRCUITRY
620

OBJECT FRAGMENTATION
CIRCUITRY
622

DELTA KEY GENERATION
CIRCUITRY
624

FLOW DATA ACQUISITION CIRCUITRY
650

| FOREIGN ID | PROXY ID | OBJECT | COROLLARY GROUP-KEY | (HIDDEN KEY) |
|---|---|---|---|---|
| 401 | 201 | 101 | 2011 | 1010 |
| 402 | 201 | 102 | 2012 | 1020 |
| 501 | 202 | 102 | 2022 | 1020 |
| ⋮ | ⋮ | ⋮ | ⋮ | ⋮ |

Figure 12:
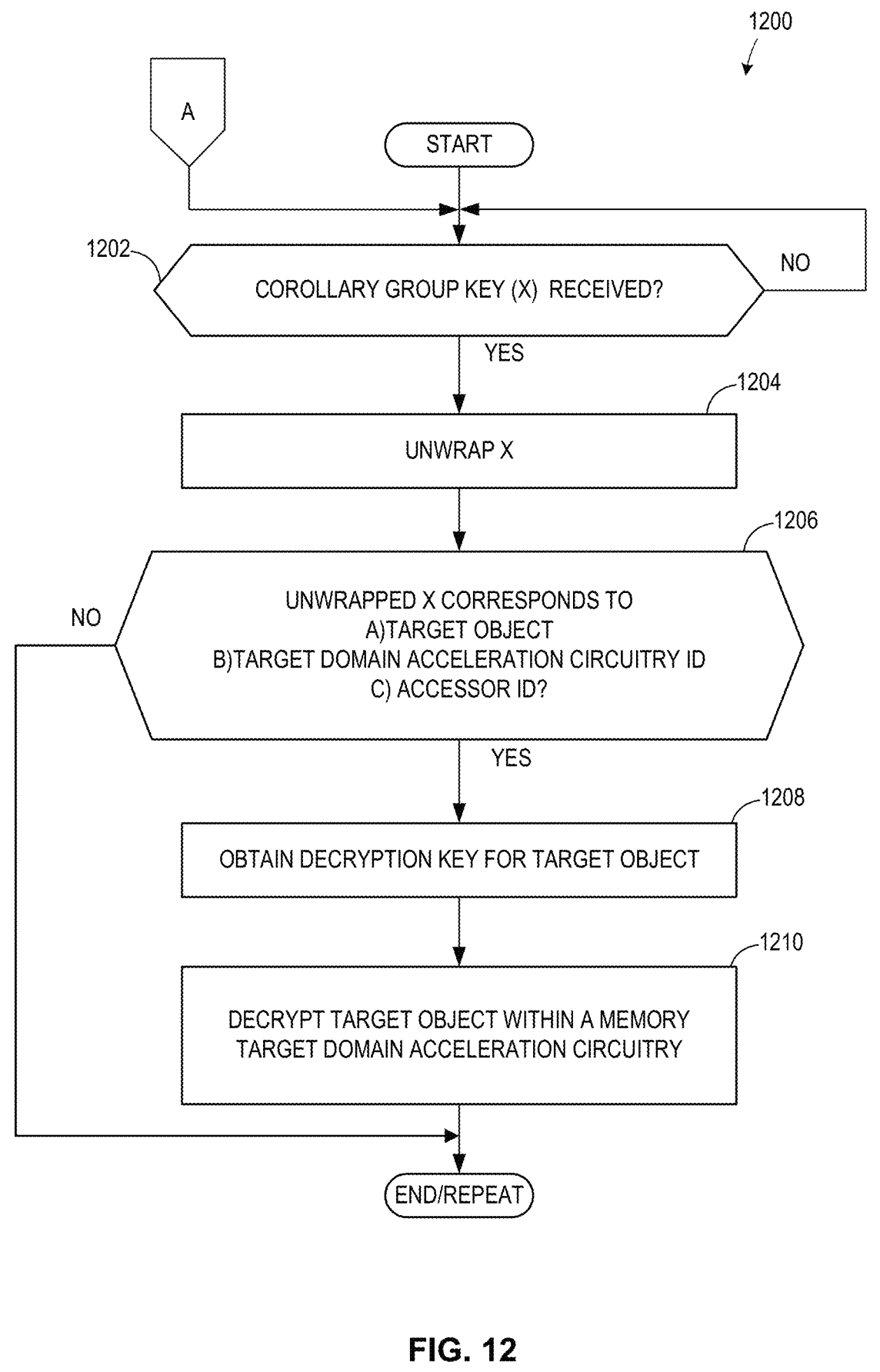

START

1202 — COROLLARY GROUP KEY (X) RECEIVED? — NO

YES

UNWRAP X — 1204

NO — UNWRAPPED X CORRESPONDS TO
A)TARGET OBJECT
B)TARGET DOMAIN ACCELERATION CIRCUITRY ID
C) ACCESSOR ID? — 1206

YES

OBTAIN DECRYPTION KEY FOR TARGET OBJECT — 1208

DECRYPT TARGET OBJECT WITHIN A MEMORY
TARGET DOMAIN ACCELERATION CIRCUITRY — 1210

END/REPEAT

START

1302

INTERMEDIARY-BASED ACCELERATOR?

NO

1304

A

YES

1306

RECEIVE REQUEST TO WRAP A KEY (CREATE COROLLARY GROUP KEY) FOR PARTICULAR TARGET DOMAIN
ACC UNIT (E.G. TEE(B→AccUnit))

1308

WRAP KEY CORRESPONDING TO THE TEE(B→AccUnit)

1310

GENERATE SECURE TUNNEL (E.G. IPSec)

1312

SEND WRAPPED KEY TO TEE(B→AccUnit) VIA IPSec

1314

A

1500

START

1502

NO — OBJECT (K) MUTATE?

YES

1504

GENERATE DELTA OBJECT (K) (WHICH IS MUCH SMALLER THAN ORIGINAL OBJECT)

1506

GENERATE DELTA KEY (E')

1508

ENCRYPT DELTA OBJECT WITH DELTA KEY

1510

WRAP DELTA KEY BASED ON INDIVIDUAL ACCESSOR PRIVILEGE

1512

DISTRIBUTE ENCRYPTED DELTA OBJECTS TO COROLLARY GROUP KEY DATABASE(S)

END

1612

SET RATE AT WEIGHTED
SUM OF CURRENT STATE AND IMMEDIATE
PAST STATE

1702
SET INITIAL SCALING FACTOR K

1704
INCREMENT SCALING FACTOR BOUNDED BY A MAX
RATE CONDITION AND A MAX SCALING FACTOR

1706
NO          CONDITION SATISFIED?

YES

1708
SET SCALING FACTOR TO 1/2

1710
CALCULATE WEIGHTED PARAMETER VALUES (a AND b)
BASED ON SCALING FACTOR AND LINK TYPE

RETURN

METHODS, SYSTEMS, ARTICLES OF MANUFACTURE AND APPARATUS TO PROTECT DISTRIBUTED DATA

FIELD OF THE DISCLOSURE

This disclosure relates generally to data sharing in networks and, more particularly, to methods, systems, articles of manufacture and apparatus to protect distributed data.

BACKGROUND

In recent years, computing networks have gravitated from a single-source cloud-based framework to a distributed framework in which heterogeneous computing devices participate in the dissemination and sharing of data and/or services.

BRIEF DESCRIPTION OF THE DRAWINGS

FIG. 6 is a schematic diagram of example data movement circuitry to protect distributed data in accordance with teachings of this disclosure.

FIG. 9 is an example group key table constructed in accordance with teachings of this disclosure.

FIGS. 12-17 are flowcharts representative of example machine readable instructions and/or example operations that may be executed by example processor circuitry to implement the example data movement circuitry and the example flow data acquisition circuitry of FIGS. 6 and 11.

In general, the same reference numbers will be used throughout the drawing(s) and accompanying written description to refer to the same or like parts. The figures are not to scale.

Figure 1:
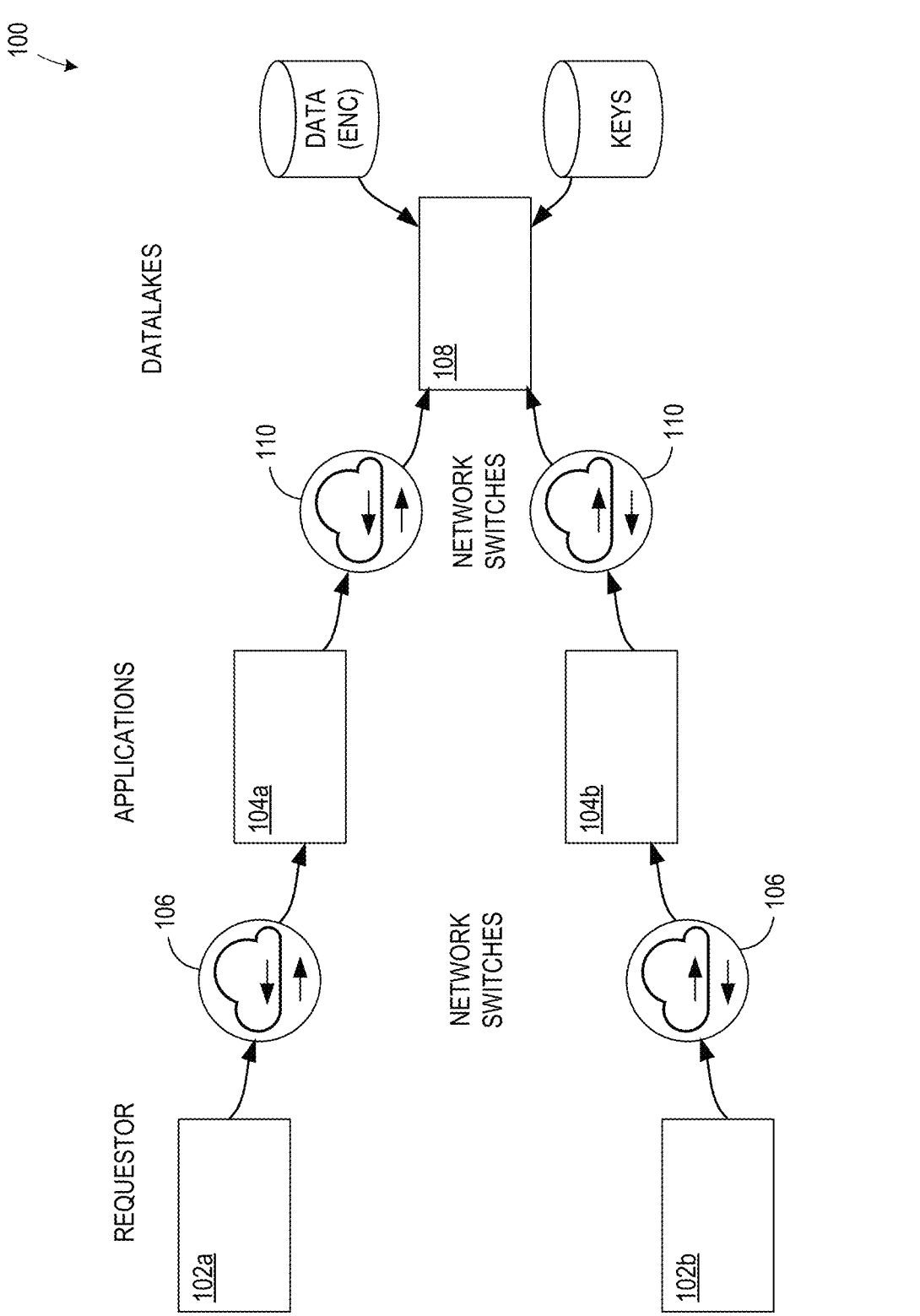
FIG. 1 is a schematic illustration of an example distributed networking environment.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two (or more) elements are directly connected and/or in fixed relation to each other. As used herein, stating that any part is in "contact" with another part is defined to mean that there is no intermediate part between the two parts.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Protecting data in distributed execution environments is important for, at least, compliance with jurisdictional regulation (e.g., General Data Protection Regulation (GDPR)), data privacy concerns and general confidence with the integrity of decentralized operations. Security of data and regulation compliant access to data continues to be a core concern as services federate operations among themselves and across different domains within particular services while being distributed over shared computing and networking infrastructures. While decentralization is one of the notable characteristics of services in an Edge network(s), public cloud operations also exhibit circumstances where the entities that interact with each other are not necessarily part of a single or same administrative or compliance domain.

When operating within one or more distributed computing environments, network administrators must appreciate several characteristics that contribute to performance expectations. Such characteristics include latency (e.g., latency is never zero), bandwidth (e.g., bandwidth is never infinite), potential variations in security protocols/policies, whether particular domains include more than a single administrator, and the homogeneity (or lack thereof) of the network(s). When making efforts to protect data in one or more networks, that data can be at rest, in transition between nodes, or both. Such data can be protected via one or more encryption techniques, which typically requires a key for subsequent decryption (e.g., a decryption key 'k'). In some examples, the key (k) is wrapped by encrypting it with another key (e.g., a wrapping key 'z') to generate a wrapped key (e.g., $x=z(k)$). The example wrapping key (z) can be specific to a receiving entity, and the wrapped key (x) is specific to the data being protected. Such key management and the generation of group keys is described in further detail below.

FIG. 1 is an example network environment 100 to illustrate an example manner of distributed networking. In the illustrated example of FIG. 1, the environment 100 includes a first node 102a and a second node 104a communicatively connected to a first network intermediary 106. As used herein, an "intermediary" is network structure that is distinguished from network nodes, devices and/or endpoints that traditionally facilitate task processing objectives. Intermediary devices are typically network structure that facilitates communication routing tasks, and includes routers, switches, hubs, proxies, gateways, etc. The example first node 102a and the example second node 104a may be realized as a machine, a computing device, or a requestor (e.g., a requesting application executing on structure, a receiving application executing on structure, a requesting device, etc.). The example first network intermediary 106 may include, but is not limited to, a network switch, a router, a hub, a proxy, a gateway, etc. In the illustrated example of FIG. 1, the first node 102a is in a first domain and the second node 104a is in a second domain different from the first domain. As used herein, a domain is a physical or logical grouping of computing devices and/or networks, in which a particular domain includes identifier information, such as a domain name commonly used in, for example, a domain name system (DNS). In some examples, a domain may include a sub-domain therein, such as a labeled and/or otherwise named grouping of computing devices and/or resources sequestered from other computing devices and/or resources of a platform (e.g., resources extended by a trusted execution environment (TEE)). In the illustrated example of FIG. 1, the requestor corresponding to the first node 102a asks/requests the second node 104a to perform one or more operations, such as to obtain data. To accomplish this request, the example second node 104a needs to request that data from a source (assuming it does not already have such data in its local storage/cache), such as from an example datalake node 108, which is in a third domain different than the first or second domains. The example second node 104a is communicatively connected to the example datalake node 108 via a second network intermediary 110. Similar to the example first network intermediary 106 described above, the example second network intermediary 110 may include, but is not limited to a network switch, a router, a hub, a proxy, a gateway, etc.

To recap, because the example first node 102a instantiated a request, the example second node 104a needs to request the data from the third source, which requires authorization to access one or more objects from the datalake. Typically, the network intermediaries conduct traffic flows using a secure shell protocol (SSH), transport layer security (TLS), datagram TLS (DTLS), etc. between requestor nodes and supplier nodes that contain the desired data (objects). In the illustrated example of FIG. 1, the second node 104a must be authenticated by the datalake node 108, and a secure channel therebetween must be established. At the time the secure channel is established, the datalake node 108 does not know what the example second node 104a will request, but at a later time that second node 104a will request some object (K) that contains the desired data originally requested by the first node 102a. In the illustrated example of FIG. 1, the object (K) is stored in an encrypted form to reduce risk when the data is in storage or transit. However, the example datalake node 108 typically requests credentials from the second node 104a (and/or request confirmation information from an access control list (ACL) within a domain associated with the datalake node 108) to confirm that the second node 104a is entitled and/or otherwise authorized to receive the contents of the object (K). If authorized, the datalake node 108 decrypts the object (K) and provides and/or otherwise propagates the contents to the second node 104a over (e.g., via) the secure channel previously established.

The above example of FIG. 1 illustrates several overheads caused by filtering of access to objects, extraction of relevant portions of data from decrypted versions, verification of credentials and access management, decryptions, transformations, re-encryptions, etc. Considering that distributed computing may involve many added nodes than shown in the illustrated example of FIG. 1, further latencies build up because the aforementioned services must be replicated throughout different nodes and corresponding domains. Such necessary efforts add complexity to the distributed network to accomplish proper cross-domain access checking and encryption/decryption of the data. In view of the heterogeneous nature of distributed networks, some services are software-based, while others include fixed function or special purpose hardware/software engines having their own heterogeneous access methods and/or protocols. These network realities illustrate challenges to support scalable low latency operations while supporting a mix of protection among domain crossings, and the further transformation of the objects involved through multiple encryption/decryption operations contributes to increased bandwidth utilization, increased CPU cycles, increased energy, etc., particularly when the objects are relatively large.

Other concerns relate to the fact that data in some objects is highly privacy sensitive. As described above, some data is scrutinized by complex requirements corresponding to GDPR and/or HIPAA compliance. In some examples, various nodes may have computable storage elements/devices, but such nodes cannot operate on encrypted data unless particular decryption keys are securely available to those storage elements. Traditional approaches of distributing decryption keys in a safe manner consume valuable resources that invoke latency issues. Even when such nodes include robust computing resources, the fact that multiple computing nodes in a distributed network are required to interact in concert and perform validation, encryption, decryption, re-encryption, transmission, etc., adversely affect latency when scale-out initiatives are attempted.

Figure 1A:
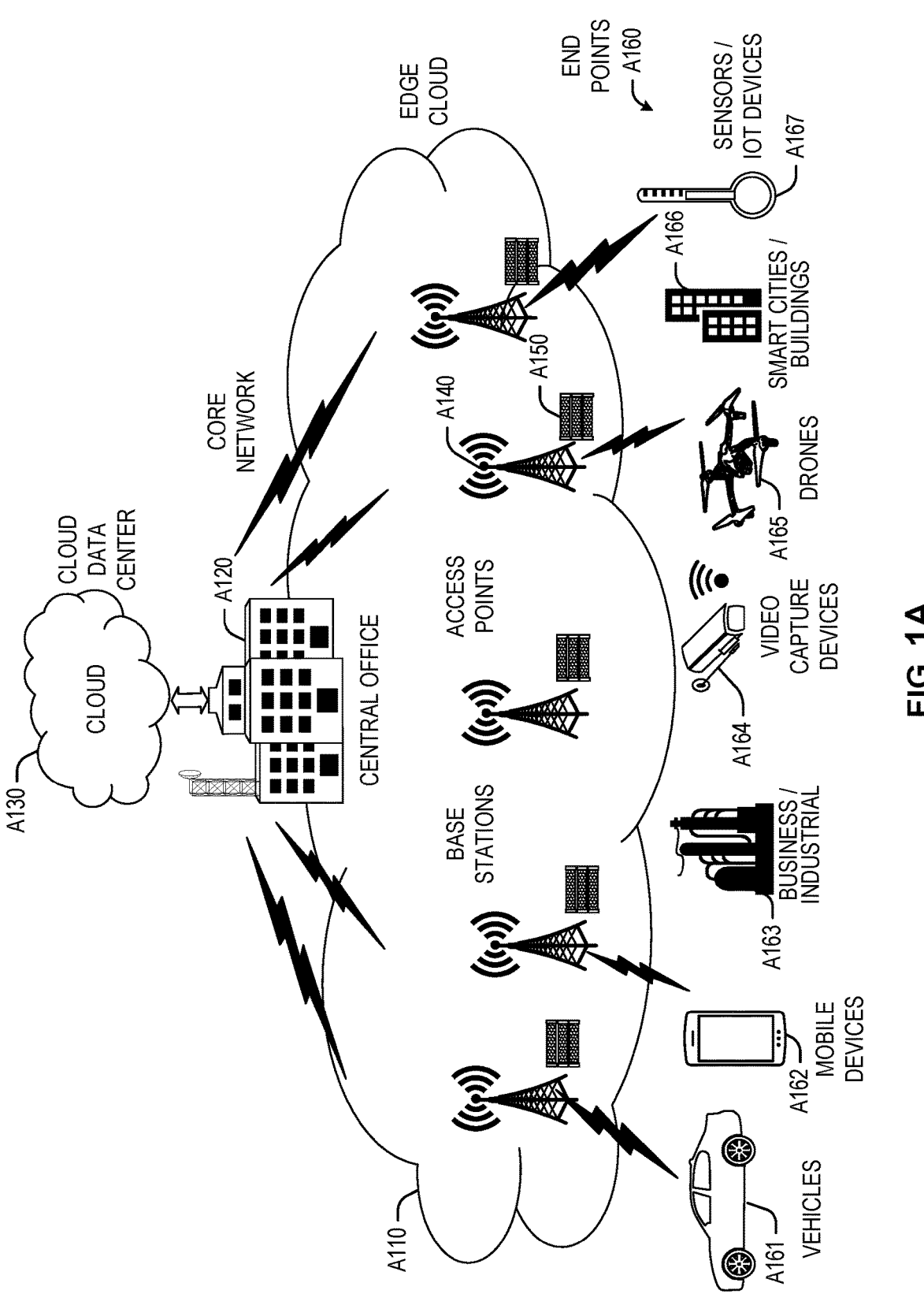
FIG. 1A illustrates an overview of an Edge cloud configuration for Edge computing.

FIG. 1A is a block diagram A100 showing an overview of a configuration for Edge computing, which includes a layer of processing referred to in many of the following examples as an "Edge cloud". As shown, the Edge cloud A110 is co-located at an Edge location, such as an access point or base station A140, a local processing hub A150, or a central office A120, and thus may include multiple entities, devices, and equipment instances. The Edge cloud A110 is located much closer to the endpoint (consumer and producer) data sources A160 (e.g., autonomous vehicles A161, user equipment A162, business and industrial equipment A163, video capture devices A164, drones A165, smart cities and building devices A166, sensors and IoT devices A167, etc.) than the cloud data center A130. Compute, memory, and storage resources which are offered at the edges in the Edge cloud A110 are critical to providing ultra-low latency response times for services and functions used by the endpoint data sources A160 as well as reduce network backhaul traffic from the Edge cloud A110 toward cloud data center A130 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to the workload data where appropriate, or, bring the workload data to the compute resources.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 1B:
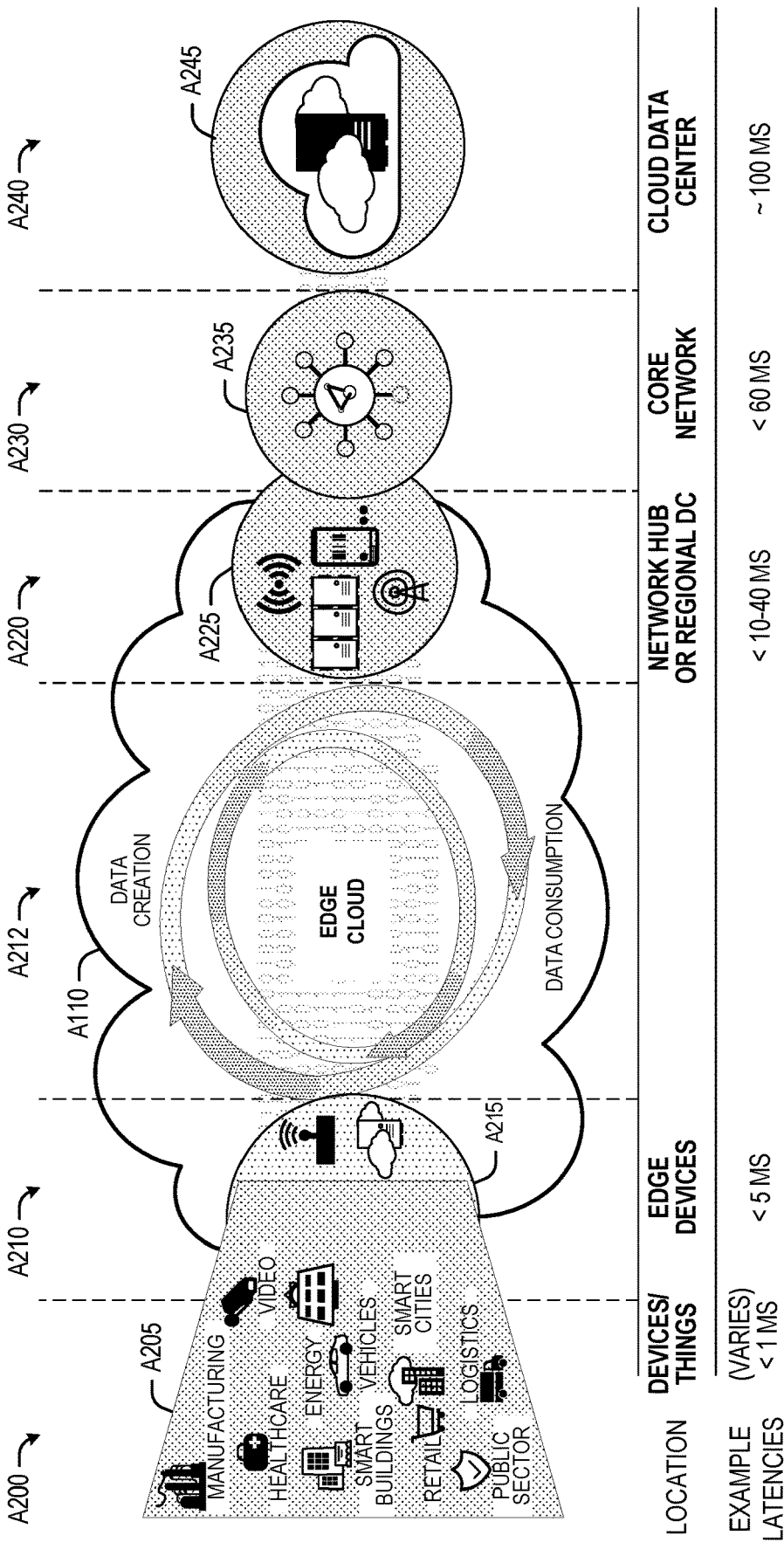
FIG. 1B illustrates operational layers among endpoints, an Edge cloud, and cloud computing environments.

FIG. 1B illustrates operational layers among endpoints, an Edge cloud, and cloud computing environments. Specifically, FIG. 1B depicts examples of computational use cases A205, utilizing the Edge cloud A110 among multiple illustrative layers of network computing. The layers begin at an endpoint (devices and things) layer A200, which accesses the Edge cloud A110 to conduct data creation, analysis, and data consumption activities. The Edge cloud A110 may span multiple network layers, such as an Edge devices layer A210 having gateways, on-premise servers, or network equipment (nodes A215) located in physically proximate Edge systems; a network access layer A220, encompassing base stations, radio processing circuitry, network hubs, regional data centers (DC), or local network equipment (equipment A225); and any equipment, devices, or nodes located therebetween (in layer A212, not illustrated in detail). The network communications within the Edge cloud A110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer A200, under 5 ms at the Edge devices layer A210, to even between 10 to 40 ms when communicating with nodes at the network access layer A220. Beyond the Edge cloud A110 are core network A230 and cloud data center A240 layers, each with increasing latency (e.g., between 50-60 ms at the core network layer A230, to 100 or more ms at the cloud data center layer). As a result, operations at a core network data center A235 or a cloud data center A245, with latencies of at least 50 to 100 ms or more, will not be able to accomplish many time-critical functions of the use cases A205. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center A235 or a cloud data center A245, a central office or content data network may be considered as being located within a "near Edge" layer ("near" to the cloud, having high latency values when communicating with the devices and endpoints of the use cases A205), whereas an access point, base station, on-premise server, or network gateway may be considered as located within a "far Edge" layer ("far" from the cloud, having low latency values when communicating with the devices and endpoints of the use cases A205). It will be understood that other categorizations of a particular network layer as constituting a "close", "local", "near", "middle", or "far" Edge may be based on latency, distance, number of network hops, or other measurable characteristics, as measured from a source in any of the network layers A200-A240.

The various use cases A205 may access resources under usage pressure from incoming streams, due to multiple services utilizing the Edge cloud. To achieve results with low latency, the services executed within the Edge cloud A110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor, etc.).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud A110 may provide the ability to serve and respond to multiple applications of the use cases A205 (e.g., object tracking, video surveillance, connected cars, etc.) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud A110 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud A110 (network layers A200-A240), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud A110.

As such, the Edge cloud A110 is formed from network components and functional features operated by and within Edge gateway nodes, Edge aggregation nodes, or other Edge compute nodes among network layers A210-A230. The Edge cloud A110 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud A110 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks, etc.) may also be utilized in place of or in combination with such 3GPP carrier networks.

The network components of the Edge cloud A110 may be servers, multi-tenant servers, appliance computing devices, and/or any other type of computing devices. For example, the Edge cloud A110 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), and/or enable submergibility. Example housings may include power circuitry to provide power for stationary and/or portable implementations, such as alternating current (AC) power inputs, direct current (DC) power inputs, AC/DC converter(s), DC/AC converter(s), DC/DC converter(s), power regulators, transformers, charging circuitry, batteries, wired inputs, and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, infrared or other visual thermal sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, rotors such as propellers, etc.) and/or articulating hardware (e.g., robot arms, pivotable appendages, etc.). In some circumstances, the sensors may include any type of input devices such as user interface hardware (e.g., buttons, switches, dials, sliders, microphones, etc.). In some circumstances, example housings include output devices contained in, carried by, embedded therein and/or attached thereto. Output devices may include displays, touchscreens, lights, light-emitting diodes (LEDs), speakers, input/output (I/O) ports (e.g., universal serial bus (USB)), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIGS. 18-20 below. The Edge cloud A110 may also include one or more servers and/or one or more multi-tenant servers. Such a server may include an operating system and implement a virtual computing environment. A virtual computing environment may include a hypervisor managing (e.g., spawning, deploying, commissioning, destroying, decommissioning, etc.) one or more virtual machines, one or more containers, etc. Such virtual computing environments provide an execution environment in which one or more applications and/or other software, code, or scripts may execute while being isolated from one or more other applications, software, code, or scripts.

Figure 1C:
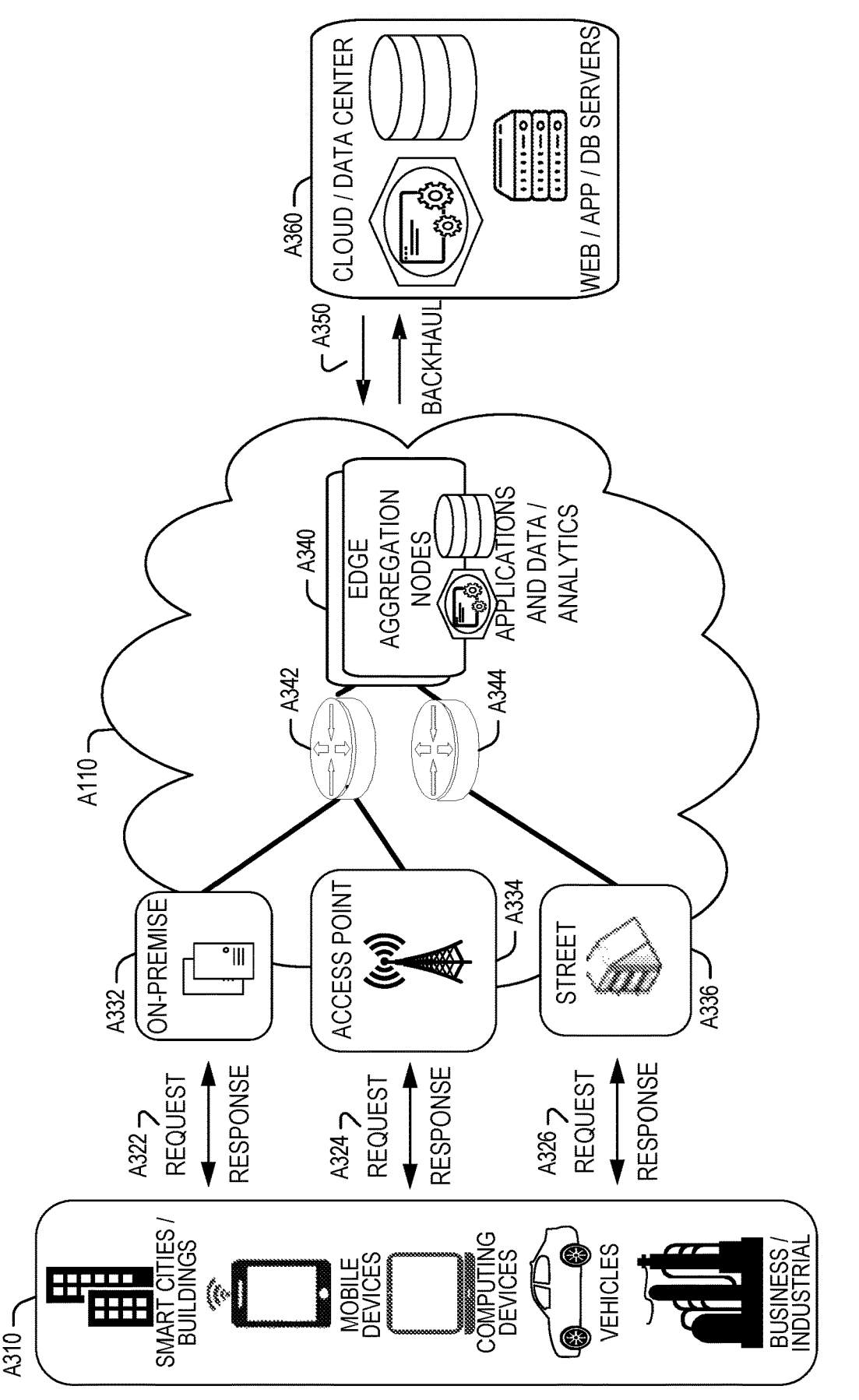
FIG. 1C illustrates an example approach for networking and services in an Edge computing system.

In FIG. 1C, various client endpoints A310 (in the form of mobile devices, computers, autonomous vehicles, business computing equipment, industrial processing equipment) exchange requests and responses that are specific to the type of endpoint network aggregation. For instance, client endpoints A310 may obtain network access via a wired broadband network, by exchanging requests and responses A322 through an on-premise network system A332. Some client endpoints A310, such as mobile computing devices, may obtain network access via a wireless broadband network, by exchanging requests and responses A324 through an access point (e.g., a cellular network tower) A334. Some client endpoints A310, such as autonomous vehicles may obtain network access for requests and responses A326 via a wireless vehicular network through a street-located network system A336. However, regardless of the type of network access, the TSP may deploy aggregation points A342, A344 within the Edge cloud A110 to aggregate traffic and requests. Thus, within the Edge cloud A110, the TSP may deploy various compute and storage resources, such as at Edge aggregation nodes A340, to provide requested content. The Edge aggregation nodes A340 and other systems of the Edge cloud A110 are connected to a cloud or data center A360, which uses a backhaul network A350 to fulfill higher-latency requests from a cloud/data center for websites, applications, database servers, etc. Additional or consolidated instances of the Edge aggregation nodes A340 and the aggregation points A342, A344, including those deployed on a single server framework, may also be present within the Edge cloud A110 or other areas of the TSP infrastructure.

Figure 1D:
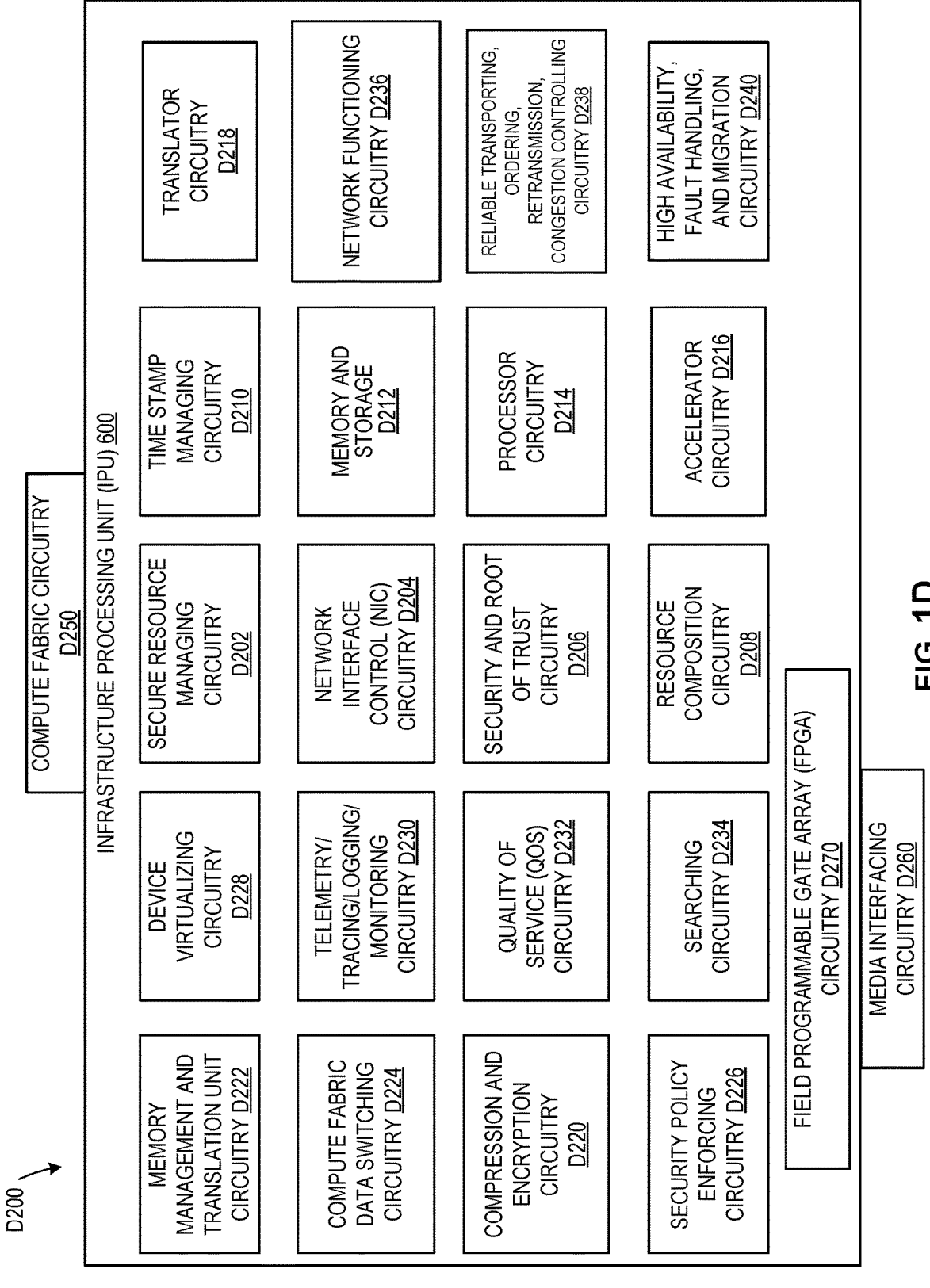
FIG. 1D is a schematic diagram of an example infrastructure processing unit (IPU).

FIG. 1D depicts an example of an infrastructure processing unit (IPU). Different examples of IPUs disclosed herein enable improved performance, management, security and coordination functions between entities (e.g., cloud service providers), and enable infrastructure offload and/or communications coordination functions. As disclosed in further detail below, IPUs may be integrated with smart NICs and storage or memory (e.g., on a same die, system on chip (SoC), or connected dies) that are located at on-premises systems, base stations, gateways, neighborhood central offices, and so forth. Different examples of one or more IPUs disclosed herein can perform an application including any number of microservices, where each microservice runs in its own process and communicates using protocols (e.g., an HTTP resource API, message service or gRPC). Microservices can be independently deployed using centralized management of these services. A management system may be written in different programming languages and use different data storage technologies.

Furthermore, one or more IPUs can execute platform management, networking stack processing operations, security (crypto) operations, storage software, identity and key management, telemetry, logging, monitoring and service mesh (e.g., control how different microservices communicate with one another). The IPU can access an xPU to offload performance of various tasks. For instance, an IPU exposes XPU, storage, memory, and CPU resources and capabilities as a service that can be accessed by other microservices for function composition. This can improve performance and reduce data movement and latency. An IPU can perform capabilities such as those of a router, load balancer, firewall, TCP/reliable transport, a service mesh (e.g., proxy or API gateway), security, data-transformation, authentication, quality of service (QoS), security, telemetry measurement, event logging, initiating and managing data flows, data placement, or job scheduling of resources on an xPU, storage, memory, or CPU.

In the illustrated example of FIG. 1D, the IPU D200 includes or otherwise accesses secure resource managing circuitry D202, network interface controller (NIC) circuitry D204, security and root of trust circuitry D206, resource composition circuitry D208, time stamp managing circuitry D210, memory and storage D212, processing circuitry D214, accelerator circuitry D216, and/or translator circuitry D218. Any number and/or combination of other structure(s) can be used such as but not limited to compression and encryption circuitry D220, memory management and translation circuitry D222, compute fabric data switching circuitry D224, security policy enforcing circuitry D226, device virtualizing circuitry D228, telemetry, tracing, logging and monitoring circuitry D230, quality of service circuitry D232, searching circuitry D234, network functioning circuitry (e.g., routing, firewall, load balancing, network address translating (NAT), etc.) D236, reliable transporting, ordering, retransmission, congestion controlling circuitry D238, and high availability, fault handling and migration circuitry D240 shown in FIG. 1D. Different examples can use one or more structures (components) of the example IPU D200 together or separately. For example, compression and encryption circuitry D220 can be used as a separate service or chained as part of a data flow with vSwitch and packet encryption.

In some examples, IPU D200 includes a field programmable gate array (FPGA) D270 structured to receive commands from an CPU, XPU, or application via an API and perform commands/tasks on behalf of the CPU, including workload management and offload or accelerator operations. The illustrated example of FIG. 1D may include any number of FPGAs configured and/or otherwise structured to perform any operations of any IPU described herein.

Example compute fabric circuitry D250 provides connectivity to a local host or device (e.g., server or device (e.g., xPU, memory, or storage device)). Connectivity with a local host or device or smartNIC or another IPU is, in some examples, provided using one or more of peripheral component interconnect express (PCIe), ARM AXI, Intel® QuickPath Interconnect (QPI), Intel® Ultra Path Interconnect (UPI), Intel® On-Chip System Fabric (IOSF), Omnipath, Ethernet, Compute Express Link (CXL), Hyper-Transport, NVLink, Advanced Microcontroller Bus Architecture (AMBA) interconnect, OpenCAPI, Gen-Z, CCIX, Infinity Fabric (IF), and so forth. Different examples of the host connectivity provide symmetric memory and caching to enable equal peering between CPU, XPU, and IPU (e.g., via CXL.cache and CXL.mem).

Example media interfacing circuitry D260 provides connectivity to a remote smartNIC or another IPU or service via a network medium or fabric. This can be provided over any type of network media (e.g., wired or wireless) and using any protocol (e.g., Ethernet, InfiniBand, Fiber channel, ATM, to name a few).

In some examples, instead of the server/CPU being the primary component managing IPU D200, IPU D200 is a root of a system (e.g., rack of servers or data center) and manages compute resources (e.g., CPU, xPU, storage, memory, other IPUs, and so forth) in the IPU D200 and outside of the IPU D200. Different operations of an IPU are described below.

In some examples, the IPU D200 performs orchestration to decide which hardware or software is to execute a workload based on available resources (e.g., services and devices) and considers service level agreements and latencies, to determine whether resources (e.g., CPU, xPU, storage, memory, etc.) are to be allocated from the local host or from a remote host or pooled resource. In examples when the IPU D200 is selected to perform a workload, secure resource managing circuitry D202 offloads work to a CPU, xPU, or other device and the IPU D200 accelerates connectivity of distributed runtimes, reduce latency, CPU and increases reliability.

In some examples, secure resource managing circuitry D202 runs a service mesh to decide what resource is to execute workload, and provide for L7 (application layer) and remote procedure call (RPC) traffic to bypass kernel altogether so that a user space application can communicate directly with the example IPU D200 (e.g., IPU D200 and application can share a memory space). In some examples, a service mesh is a configurable, low-latency infrastructure layer designed to handle communication among application microservices using application programming interfaces (APIs) (e.g., over remote procedure calls (RPCs)). The example service mesh provides fast, reliable, and secure communication among containerized or virtualized application infrastructure services. The service mesh can provide critical capabilities including, but not limited to service discovery, load balancing, encryption, observability, traceability, authentication and authorization, and support for the circuit breaker pattern.

In some examples, infrastructure services include a composite node created by an IPU at or after a workload from an application is received. In some cases, the composite node includes access to hardware devices, software using APIs, RPCs, gRPCs, or communications protocols with instructions such as, but not limited, to iSCSI, NVMe-oF, or CXL.

In some cases, the example IPU D200 dynamically selects itself to run a given workload (e.g., microservice) within a composable infrastructure including an IPU, xPU, CPU, storage, memory, and other devices in a node.

In some examples, communications transit through media interfacing circuitry D260 of the example IPU D200 through a NIC/smartNIC (for cross node communications) or loopback back to a local service on the same host. Communications through the example media interfacing circuitry D260 of the example IPU D200 to another IPU can then use shared memory support transport between xPUs switched through the local IPUs. Use of IPU-to-IPU communication can reduce latency and jitter through ingress scheduling of messages and work processing based on service level objective (SLO).

For example, for a request to a database application that requires a response, the example IPU D200 prioritizes its processing to minimize the stalling of the requesting application. In some examples, the IPU D200 schedules the prioritized message request issuing the event to execute a SQL query database and the example IPU constructs micro-services that issue SQL queries and the queries are sent to the appropriate devices or services.

Examples disclosed herein improve distributed caching tasks to reduce latency, reduce computational demands on nodes, and/or reduce service replication throughout a distributed network. In some examples disclosed herein, intermediary-based accelerators are utilized and/to provision lightweight key-value cache at or near the intermediaries. In some examples, the caches are relatively low in lookup cost when compared to node-based traditional cache techniques. As used herein, "accelerators" are computing structure(s) that reduce computing burdens of network nodes, which may be realized as computing circuitry added to the computing node and/or computing circuitry that is near the computing nodes that it services. Example accelerators disclosed herein perform specific tasks of encryption and/or decryption that may utilize group keys distributed to any number of tenants (e.g., user equipment (UE) that interacts with user agent(s) (UA)). In particular, examples disclosed herein facilitate "corollary" group keys as distinguished from keys that may merely be distributed to two or more node entities and/or intermediaries. As described in further detail below, corollary group keys exhibit an established interrelationship of parameters to cause a functional and/or otherwise expected outcome.

In some examples, corollary particular group keys are associated with a tenant that can operate and/or otherwise control any number of UE devices. As used herein, an "accessor" is an entity that includes a UA and its corresponding UE. Example UEs include devices such as the example autonomous vehicles A161, the example user equipment A162, the example business and industrial equipment A163, the example video capture devices A164, the example drones A165, the example smart cities and building devices A166, and/or the example sensors and IoT devices A167 of FIG. 1A. Example UAs include service entities (e.g., software executing on computing devices corresponding to the UE) that operate on behalf of UE interests, goals and/or tasks.

Examples disclosed herein enable accessors to participate with any number of devices in a group, in which the corollary group key(s) (sometimes referred to herein as "shadow keys") is/are provided to, replicated to, and/or otherwise available to any number of UAs that may function as a particular group to perform one or more desired tasks. Shadow keys (corollary keys) have relevance and/or a predetermined relationship, just as a shadow has a relationship to a corresponding object creating a shadow. In some examples, there may be any number of UAs acting on behalf of a UE. In some examples, one or more UAs possess a corollary group key to authenticate the UE by proxy or facilitate data protection techniques (e.g., encryption). Corollary group keys may be provided by and/or replicated by group key servers (and/or provided from other key-value caches).

Example intermediaries disclosed herein, such as switches, routers, hubs, proxies, gateways, etc., provide in-the-flow bridging between secure domains by at least one of (a) providing corollary group keys to accessing entities and letting the accessing entities obtain encrypted objects directly through widely distributed caches, replica servers, etc., (b) providing corollary group keys to trusted execution environment (TEE) components at the accessing entities (e.g., at a node having a hardware TEE), or (c) providing corollary group keys to accelerators within the intermediaries.

In some examples, accelerators within the intermediaries facilitate bridging and/or otherwise propagating protected objects (e.g., encrypted objects having desired data therein). In some examples, the protected objects are widely available due to localized caching and replication throughout the distributed network. Further, examples disclosed herein register immutable credentials (e.g., fingerprints, physical unclonable functions (PUFs), etc.) corresponding to the accelerators that are stored in the key-value caches. As a result, because the intermediaries perform the in-the-flow bridging (e.g., in-the-flow propagation), a machine in a first domain does not need to be attested to in a second domain to receive an object(s) for which is already has the needed capabilities. Stated differently, examples disclosed herein facilitate bypassing of node-to-node attestation and shift authentication tasks to network intermediaries (e.g., network intermediaries that are proximately near one or more nodes of interest).

Figure 2:
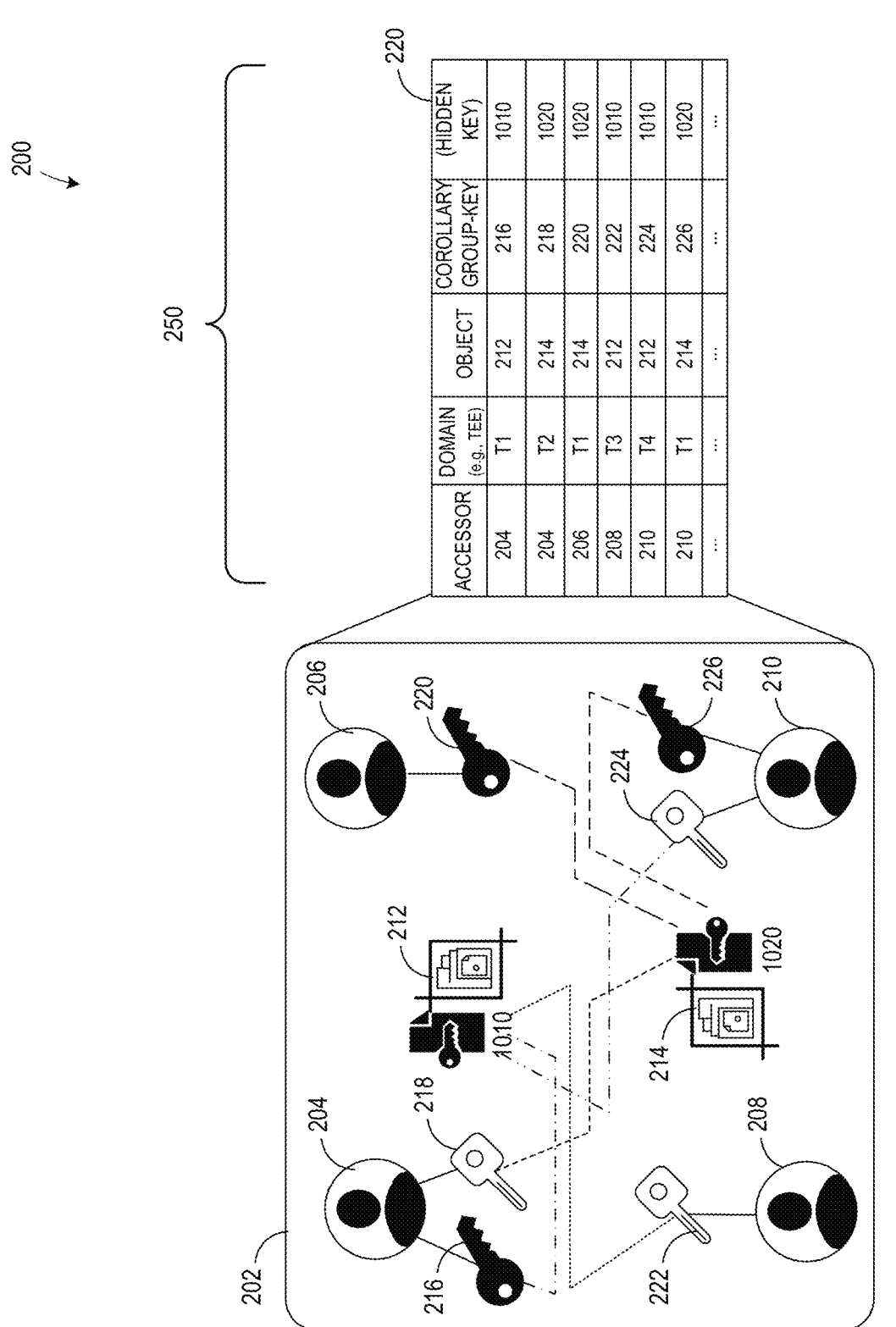
FIG. 2 illustrates an example group key framework constructed in accordance with teachings of this disclosure.

Examples disclosed herein employ corollary group keys, aspects of which are illustrated in FIG. 2 as an example corollary group key framework 200. In the illustrated example of FIG. 2, a networking environment 202 includes a first accessor 204, a second accessor 206, a third accessor 208 and a fourth accessor 210. As described above, the example accessors may include entities (e.g., UEs such as computing nodes, a computing system, etc.) and their corresponding UAs, either of which may include particular identifiers, as described below. Accessors also include a particular identifier and/or a user identifier that is used to initiate a request for data and/or services on a network. As described above, example accessors include, but are not limited to devices associated with particular user identification credentials, devices associated with particular biometric data, particular services operating/executing on a corresponding UE, etc., in which such credentials/data refer to a corresponding node, system and/or device (e.g., a computing device communicatively connected to a network). The illustrated example of FIG. 2 also includes a corollary group key assignment table 220 to aid in the discussion below. In some examples, the accessor is located at a computing node that is communicatively connected to other accessors within the example networking environment 202. The example networking environment 202 also includes a first object 212 and a second object 214, which may include data that has been encrypted with a first hidden key 1010 and a second hidden key 1020, respectively. In some examples, the hidden keys are referred to as wrapped keys that are used to protect their respective objects. For instance, to allow the example first object 212 to be transmitted and/or otherwise made available in an unsecured environment, it is first encrypted and its contents are only accessible via access to the first hidden key 1010, which is secured by the second hidden key 1020 (e.g., sometimes referred to herein as a key-wrapped-key or a key-wrapping-key (KWK)).

The illustrated example of FIG. 2 also includes a first corollary group key 216, a second corollary group key 218, a third corollary group key 220, a fourth corollary group key 222, a fifth corollary group key 224, and a sixth corollary group key 226. In some examples, the aforementioned keys may be generated, represented and/or otherwise reside as an example data structure 250. While the illustrated example of FIG. 2 includes six (6) different corollary group keys, different numbers of corollary group keys may be present (e.g., and can vary in number), in which the six different corollary group keys are used herein for purposes of illustration and not limitation. Each corollary group key represents a pre-established combination of (a) an accessor (e.g., an accessor identifier), (b) a domain (e.g., a domain identifier), (c) an object (e.g., an object identifier), and (d) a corresponding hidden key that, when unwrapped (e.g., decrypted to expose contents therein), permits decryption of the object. For instance, first corollary group key 216 contains within it the first hidden key 1010 (a wrapped key), where key 1010 is protecting the example first object 212 and the first corollary group key 216 is specific to the combination of the first accessor 204 and domain T1. As such, possession of the first corollary group key 216 enables the first accessor 204 access to data of the first object 212 (e.g., in which the object itself may be stored in a memory or storage device) only when acting through domain T1 and/or operating within domain T1. As described in further detail below, successful association between the accessor and the corollary group key may include identity services from identity based public key encryption (IBPKE) protocols.

Figure 3:
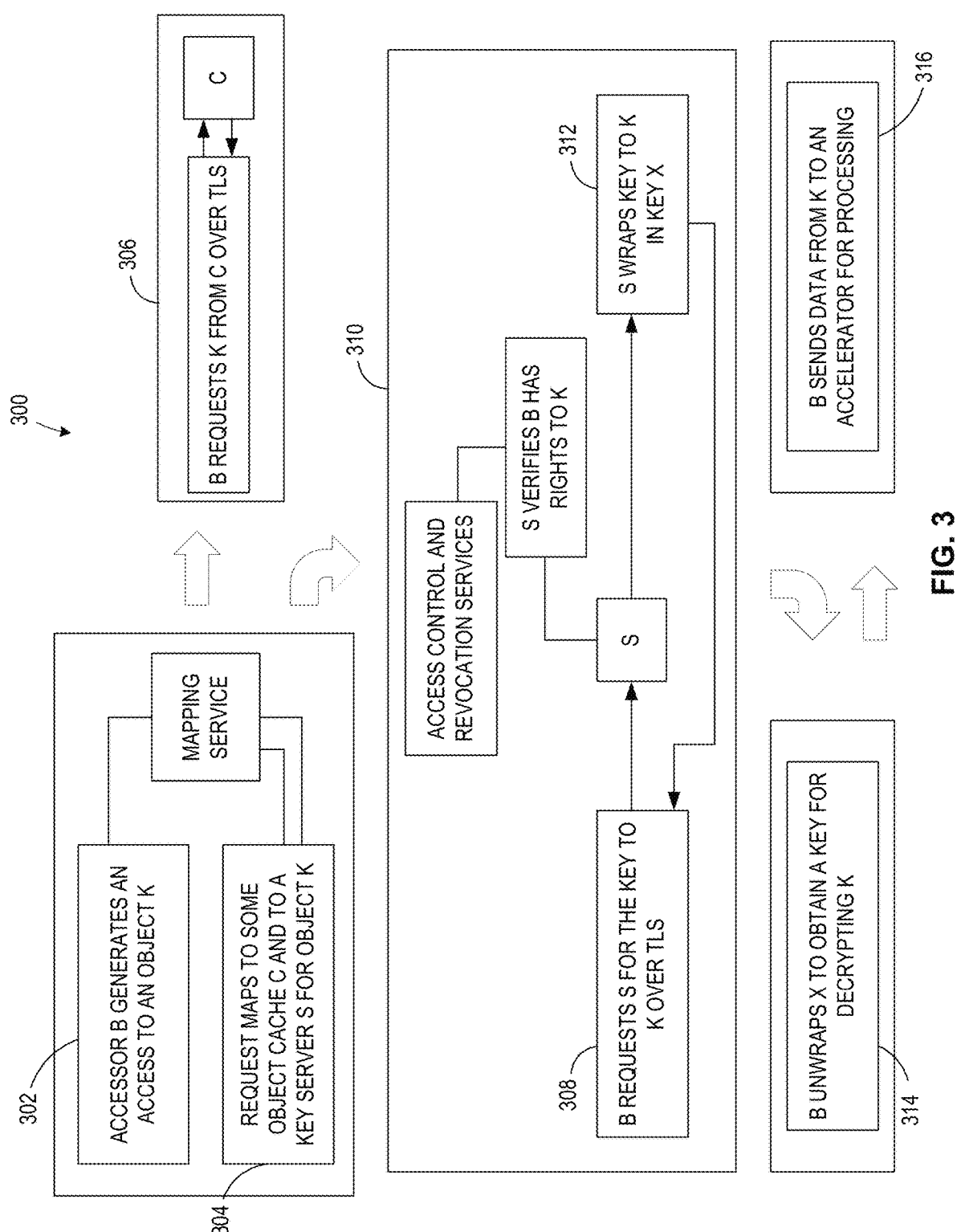
FIG. 3 illustrates an example distributed access framework constructed in accordance with teachings of this disclosure.

FIG. 3 illustrates an example traditional or classic distributed network access framework 300. In the illustrated example of FIG. 3, the classic network access framework 300 is attempting to supply an encrypted object (K) to an accessor (B), in which accessor (B) generates an access request for the object (K) via one or more mapping services (block 302). As used herein, a "mapping service" includes any directory service (e.g., domain name service (DNS)). In examples disclosed herein, the mapping service (e.g., the directory service) may route one or more requests on the basis of looking up one or more distributed data structures such as a distributed key value store, such as Redis (an open source database), Aerospike (a flash memory and in-memory open source distributed key value NoSQL database management system), Ignite, etc., that can provide lookup service. In some examples, a first accessor may use the directory service (e.g., a directory service interface/circuitry) to indicate that it wants an object K (by name, URL, URI, etc), and the directory service looks up nearby caching nodes and/or key-value store home nodes to determine the best (e.g., nearest, fastest, etc.) copy of object K to find for the requesting accessor. In some examples, the directory service performs an authorization/access check function using another similar directory lookup function to determine which server (e.g., ACL server) or caching node to contact in order to identify a particular server S for obtaining the key for the object.

The example mapping services reveal that an object cache (C) contains object (K) and requires authorization or access via server (S) to obtain a key for such access (block 304). Now that accessor (B) is aware of the location of object (K) at the cache (C), accessor (B) makes a request for the object (K) using TLS (block 306). However, despite having possession of the object (K), accessor (B) is still unable to access the contents of object (K) because it does not yet have the necessary key (e.g., the hidden key).

Object (B) makes a request for a key (X) associated with object (K) from server (S) (block 308). Such requests may operate over a TLS connection so that server (S) can authenticate and verify that accessor (B) is entitled to receive and/or otherwise obtain object (K), which may involve a number of services corresponding to access control and revocation techniques (block 310). In particular, the number of services employed to facilitate access control typically require any number of disparate authentication relationships and communication bandwidth to confirm such relationships to/from the server (S) that may be located anywhere within a network system (e.g., an Edge network). After successful verification, server (S) wraps a hidden key encrypting the object (K) to produce a key (X), which server (S) sends to accessor (B) (block 312).

Accessor (B) (e.g., a requesting device with a particular identifier associated with that device) then unwraps (e.g., decrypts) the corollary group key (X) to obtain the hidden key with which object (K) is encrypted and proceeds to decrypt object (K) (block 314). As such, the decrypted object (K) is now available to accessor (B) as cleartext. At this point, accessor (B) is able to use and/or otherwise process the desired data, such as by sending the cleartext data to one or more accelerators for processing (block 316).

While the aforementioned classic access flow facilitates protected access to object (K) in a distributed network, several inefficiencies exist that become particularly problematic when efforts to scale occur. In particular, the example classic network access framework 300 requires the lock step coordination between numerous entities, such as accessor (B), server (S), access control and revocation services, and cache (C). In other words, the classic framework 300 exposes numerous vulnerabilities or attack surfaces. Additionally, the example framework 300 relies upon accessor (B) to manage and/or otherwise perform key request tasks, key unwrapping, decryption and management of cleartext.

Improvements may be realized by examples disclosed herein by preventing and/or otherwise removing the burden from accessor (B) (e.g., a device (UE) and/or UA with a particular identifier named "B") from receiving and/or otherwise obtaining and managing the corollary group key (X). Instead, examples disclosed herein implement a hardened key protection environment, such as a trusted platform module (TPM), a hardware security module (HSM), a secure enclave (SE), a security co-processor, and/or a trusted execution environment (TEE) at accessor (B), referred to herein as TEE(B) 410. While a TEE is disclosed in examples herein corresponding to an example hardened key protection environment, such examples are not limiting and used for ease of discussion. In some examples, accessor (B) may be represented as a system 400 shown in the illustrated example of FIG. 4, which includes a Trusted Platform Module (TPM) 402. The example system 400 of FIG. 4 may be a computing node that includes processor circuitry 404, memory circuitry 406, storage circuitry 408, etc. Additionally, because of the example TPM 402 extending the root of trust incrementally to components of the system 400, TEE(B) 410 is formed as a sandbox, such as an SGX enclave, a TDX domain, a gVisor sandbox, etc. that is separate from application software corresponding to accessor (B). As such, instead of exposing decrypted object (K) to unsecured components of accessor (B), example TEE(B) 410 decrypts object (K) and sends data to an accelerator. At least one improvement in this scenario is that cache (C) does not need to be relied upon for decryption services, which may otherwise expose cleartext as an attack surface. That is, decryption and/or re-encryption of data with a corollary group key now occurs closer to where the data gets used and allows cache (C) to provide encrypted objects to various destinations. This effectively decouples security procedures from requiring authentication between many computing nodes in a chain, and enables distributed protected caching without risk of compliance issues.

Figure 4:
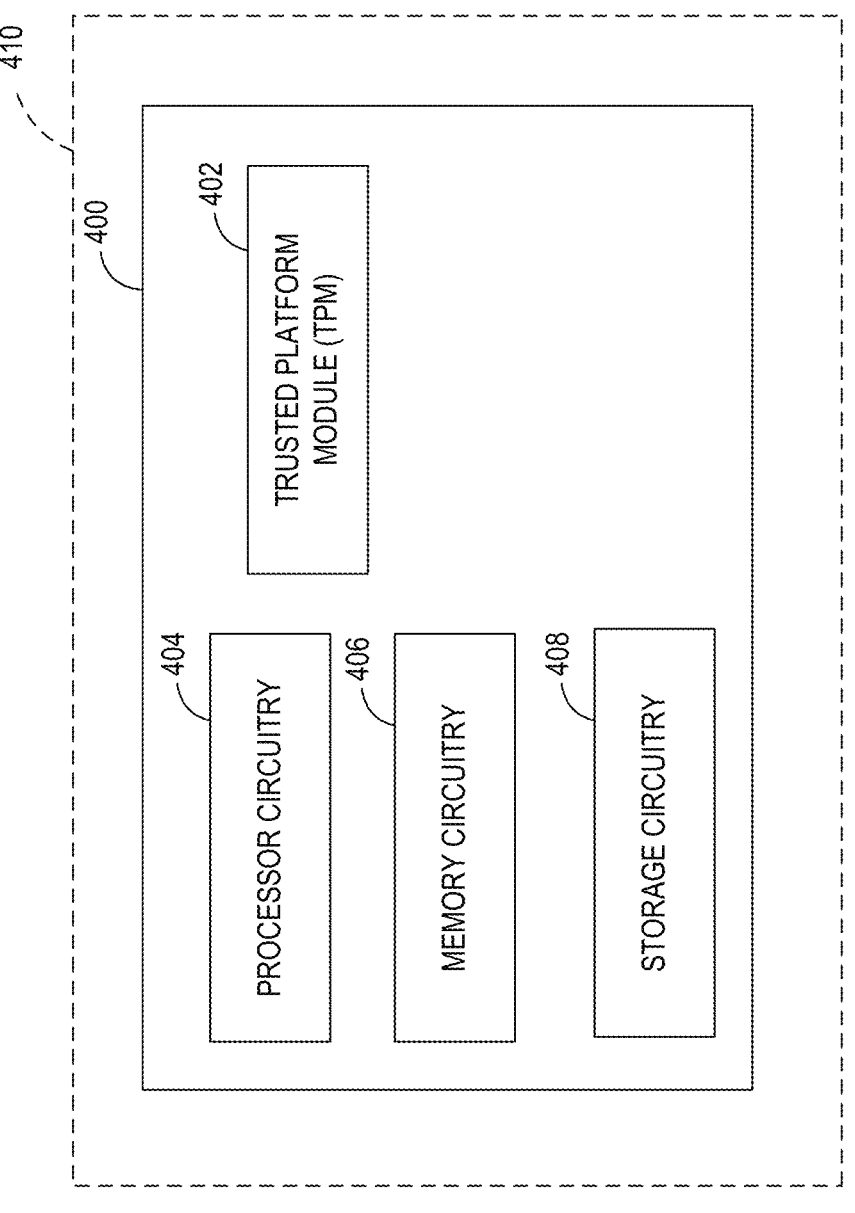
FIG. 4 is a schematic diagram of an example computing node constructed in accordance with teachings of this disclosure.
Figure 5A:
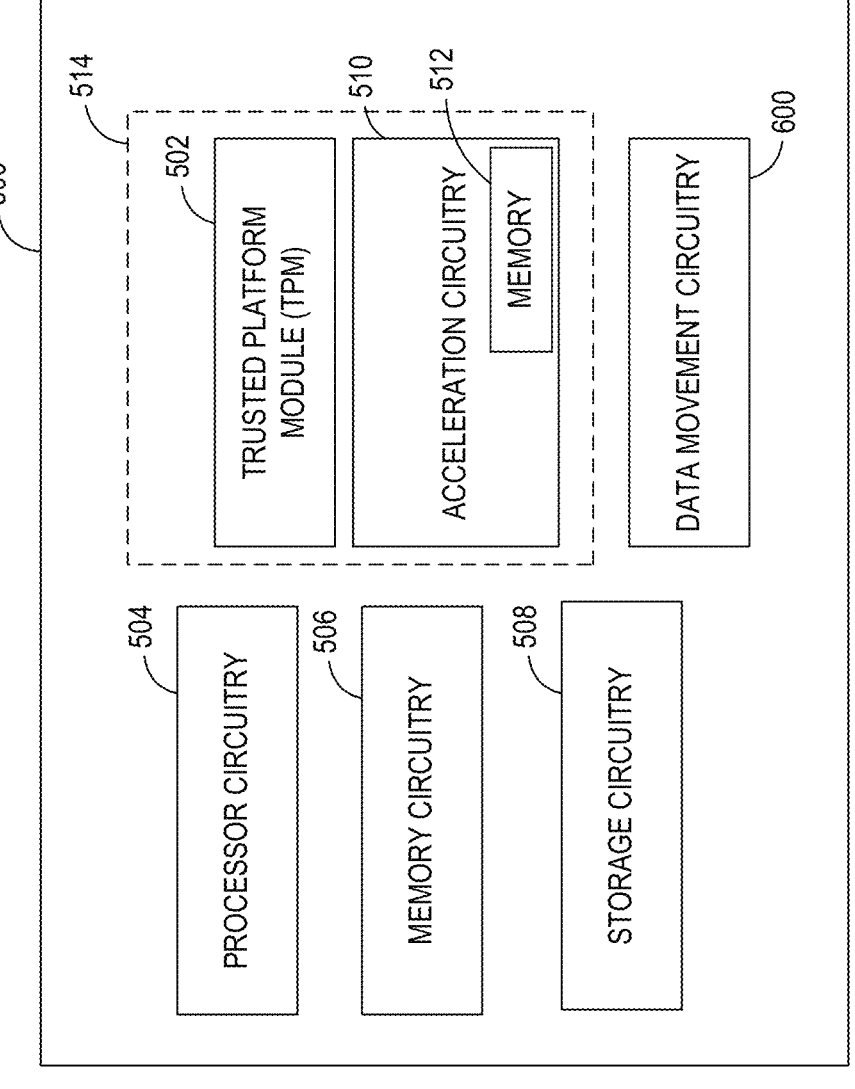
FIG. 5A is a schematic diagram of an example computing node to protect distributed data in accordance with teachings of this disclosure.

Further improvements may be realized by implementing an accelerator (e.g., a dedicated accelerator) within the example system 400 of FIG. 4. FIG. 5A illustrates an example system 500 (e.g., a computing node within a distributed network) that includes an example TPM 502, example processor circuitry 504, example memory circuitry 506, example storage circuitry 508, an example accelerator 510 (accelerator circuitry), in which the example accelerator 510 may include its own example accelerator memory 512. In some examples, the accelerator 510 is added in a manner that does not detract and/or otherwise burden other structure of the example system 500 for particular tasks that might be requested and/or performed. Stated differently, the example accelerator 510, accelerator memory 512 and/or TPM 502 may operate in a manner that does not interfere with other native structure of the system 500, which may execute one or more processes (e.g., software instructions) that are deemed insecure. The example system 500 may be realized as, for instance, an accessor, such as a host (e.g., a hardware host). The example accelerator 510, by virtue of the TPM 502, is referred to herein as TEE(B→Accel), meaning that the accelerator 510 is within system 500 (e.g., accessor (B)) as a hardware host, and where TEE(B→Accel) 510 is walled off from other components of the system 500 (and/or any software running on that system 500) by a trust boundary 514. As such, the attack surface is reduced because various components of the system 500 are not relied upon as much as when compared to the illustrated example of FIG. 4. Rather than reliance upon components/structure/circuitry of the native components of the system 500, unwrapping of the corollary group key(s) is performed by the example accelerator 510 and the decrypted cleartext is saved in the protected memory 512 of that accelerator 510. This reduces the attack surface to the accelerator 510 only. The illustrated example of FIG. 5A also includes example data movement circuitry 600, described in further detail below in connection with FIG. 6.

Figure 5B:
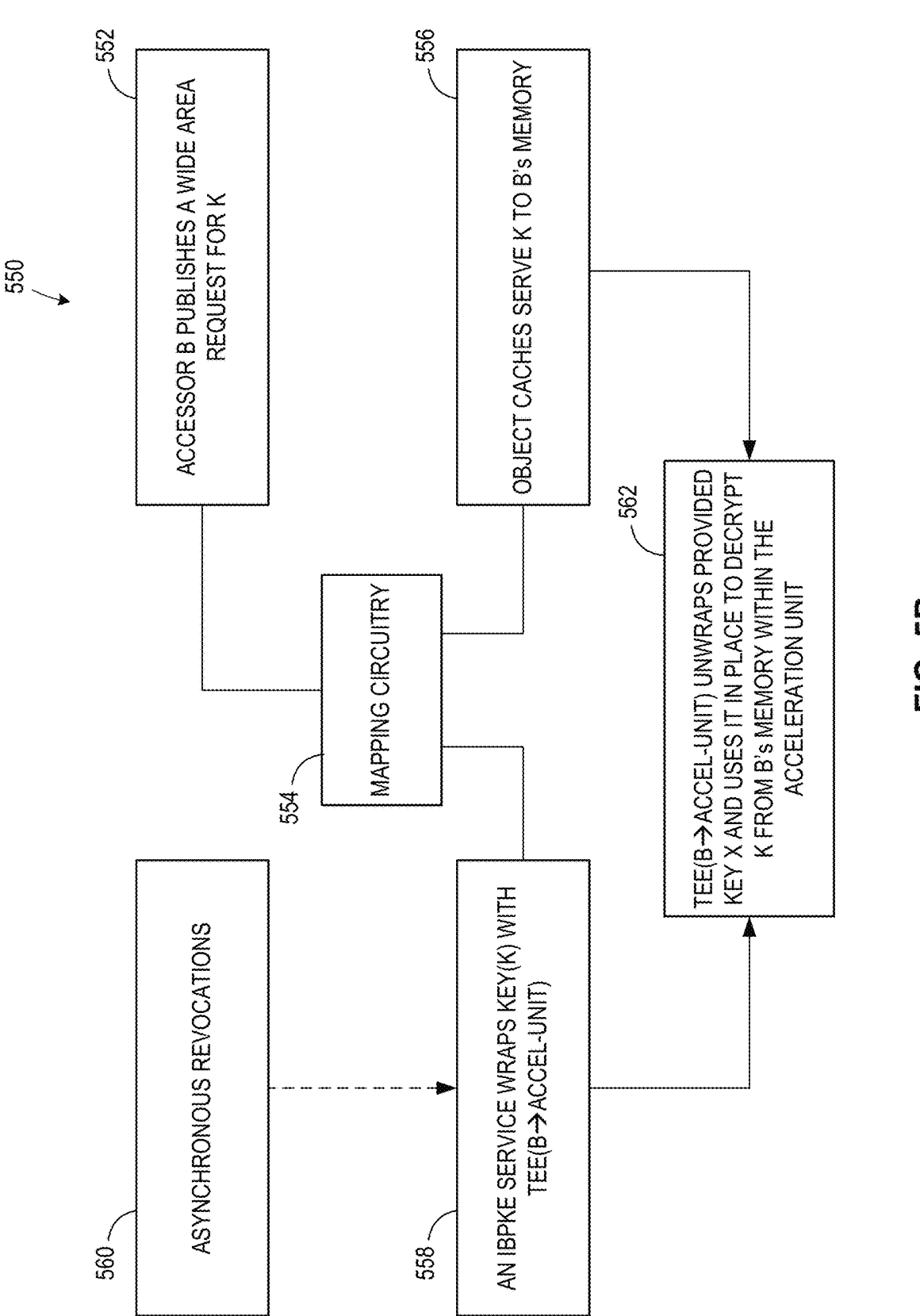
FIG. 5B illustrates an example distributed network framework constructed in accordance with teachings of this disclosure.

Additionally, and in view of FIG. 5B, there is no longer a need for server (S). In particular, independent servers may not operate as a lightweight service to be coordinated with the example system 500. FIG. 5B illustrates an example distributed network framework 550 in which an accessor (B) publishes a wide area request for object (K) (block 552) from example mapping circuitry 554, and nearby object caches serve that object (K) to the example memory circuitry 506 (block 556). As described above, the object (K) is in an encrypted form and protected by a hidden key, for which the hidden key is further protected by a corollary group key. In the illustrated examples of FIGS. 5A and 5B, flows are further streamlined with the use of IBPKE, which generates a wrapping key that is specific to the identity and credentials corresponding to TEE(B→Accel) 510 (block 558), such as its unique signature, PUF, etc. Thus, the whole surface of TEE(B) is not needed and, instead, the more narrow (e.g., less exposed) surface of TEE(B→Accel) 510 will be used via verification with the relatively lightweight IBPKE service. Additionally, the example IBPKE service facilitates asynchronous revocations to invalidate credentials, as needed (block 560). The illustrated example of FIG. 5B also enables TEE(B→Accel) 510 to perform the key unwrapping so that object (K) can be decrypted and placed within the memory 512 of that accelerator (acceleration circuitry) (block 562).

In view of the example systems of FIGS. 4 and 5A, and in view of the example frameworks of FIGS. 3 and 5B, FIG. 6 illustrates example data movement circuitry 600 to facilitate example methods, apparatus, articles of manufacture and systems to protect distributed data. In the illustrated example of FIG. 6, the data movement circuitry 600 includes example intermediary based interface circuitry 602, example unwrap circuitry 604, example group key analysis circuitry 606, example decryption circuitry 608, example intermediary detection circuitry 610, example encryption circuitry 612, example Internet protocol security (IPSec) circuitry 614, example target registration circuitry 616, example target duration circuitry 618, example mutation detection circuitry 620, example object fragmentation circuitry 622, and example delta key generation circuitry 624. Additionally, and as discussed in further detail in connection with FIG. 11, the example data movement circuitry 600 includes flow data acquisition circuitry 650.

In operation, the example data movement circuitry 600 uses IBPKE corollary group keys to streamline protected access for objects in a manner that avoids reliance upon an external server (e.g., see server (S) of FIG. 3) and reduces a potential attack surface for devices processing object decryption. In some examples, object decryption is performed at a node device (e.g., system 500 of FIG. 5A) and the example data movement circuitry 600 is included in the example system 500. The example intermediary based interface circuitry 602 interfaces with an IBPKE service to determine whether a corollary group key (X) has been received. If so, the example unwrap circuitry 604 instantiates the example acceleration circuitry 510 to unwrap the corollary group key (X) so that the example corollary group key analysis circuitry 606 can instantiate the accelerator (acceleration circuitry) 510 to analyze its particular configuration. For instance, the corollary group key analysis circuitry 606 examines (and/or causes the acceleration circuitry 510 to examine or parse) the received and/or otherwise retrieved corollary group key (X) to identify a corollary group key identifier combination. Stated differently, the corollary group key (X) may include data, metadata and/or information that, when examined or parsed, reveals further information corresponding to combinations of identifiers associated with the corollary group key (X). In some examples, the process of examining or parsing the retrieved corollary group key (X) exposes the one or more combinations of identifiers that make up the corollary group key (X). The example corollary group key identifier combination includes information, metadata and/or data structures associated with the corollary group key that identify a particular target object associated with the corollary group key (X), a particular target domain acceleration circuit identifier (e.g., a signature of an accelerator, a PUF of an accelerator, etc.), and a particular accessor identifier (e.g., an identifier associated with a particular UA and/or UE). As described above in connection with FIG. 2, mere possession of the corollary group key (X) does not advance and/or otherwise facilitate particular access to data objects and/or hidden keys unless all conditions (e.g., conditions of the computing device or intermediary (possessor) that will use the corollary group key) of the corollary group key (X) are met. In other words, an example corollary group key identifier combination must match a corresponding node identifier combination (in which the node identifier combination (e.g., or a platform identifier combination) includes pre-established and/or otherwise pre-defined characteristics of access or possession of the particular object (e.g., an encrypted object stored in a memory or storage accessible to the computing device or intermediary (possessor)), the corresponding target domain acceleration circuit identifier, the particular accessor identifier). While candidate nodes, computing devices and/or intermediaries may not have pre-existing relationships and/or or authentication therebetween, example corollary group keys facilitate pre-existing conditions that must be true so that such candidate nodes, computing devices and/or intermediaries can function as though trust has been extended therebetween. For instance, if the possessor of the corollary group key (X) has a same accessor identifier (e.g., particular credentials, particular biometric data signature(s), etc.), acts through or within a same domain, and exhibits a same signature (e.g., a signature corresponding to particular hardware of a computing device, such as a PUF corresponding to acceleration circuitry), then the possessor of the corollary group key (X) will gain access to the hidden key therein that is needed for further object decryption. Additionally, example corollary group keys disclosed herein may be unitless and/or otherwise dimensionless values, and in some examples corollary group keys may include particular units, labels and/or dimensions. For instance, an example dimensionless value corresponding to a corollary group key or a field/parameter/characteristic of the example corollary group key is a hash value and/or signature corresponding to an accelerator (e.g., a PUF). In some examples, a corollary group key or a field/parameter/characteristic of the example corollary group key is an Internet Protocol (IP) address range such that threshold IP address values may be deemed authorized.

In response to the example group key analysis circuitry 606 determining that the accessor (possessor) of the shadow key (X) satisfies conditions for access (e.g., the corollary group key identifier combination matches the node identifier combination), the example unwrap circuitry 604 obtains a decryption key (hidden key) and/or instantiates the accelerator 510 to obtain the decryption key that corresponds to the target object (K). In some examples, the unwrap circuitry 604 verifies that the target object (K) is stored in a protected memory prior to exposing the hidden key, thereby safeguarding the contents of the target object (K) when any subsequent decryption exposes underlying cleartext data. In some examples, the unwrap circuitry 604 verifies that memory is protected memory based on services instantiated by a trusted execution environment (TEE) or a secure enclave (e.g., Intel® SGX®). As described above, the corollary group key (X) protects the underlying decryption key based on a particular combination of parameters so that the corollary group key (X) can be used to decrypt the contents of the target object (K). The example decryption circuitry 608 proceeds to instantiate the accelerator 510 to decrypt the target object and save it to the protected memory 512.

Figure 7:
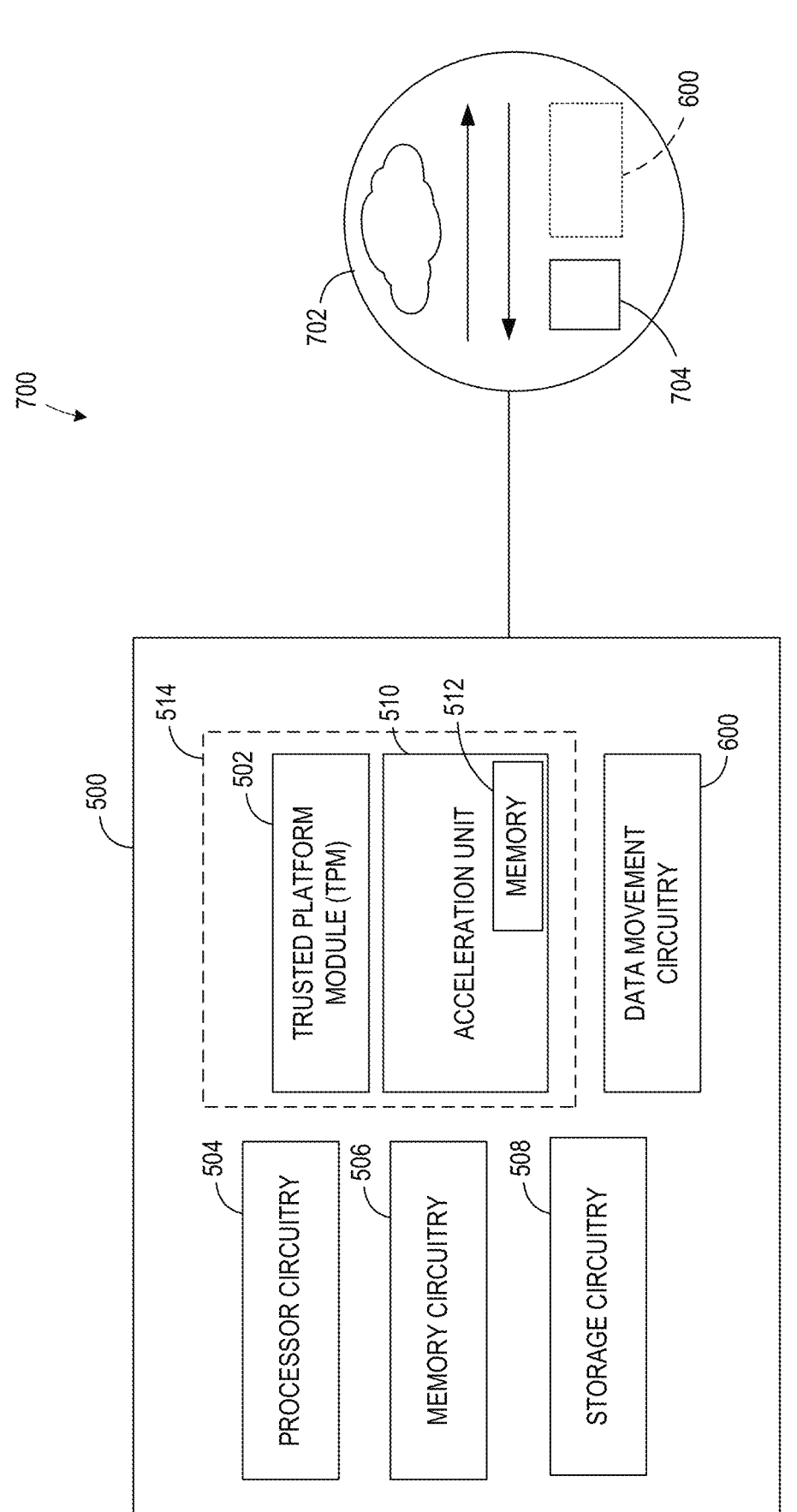
FIG. 7 is a schematic diagram of an example intermediary-based group key supplier system constructed in accordance with teachings of this disclosure.

While the aforementioned example system 500 receives and/or otherwise retrieves corollary group keys via any IBPKE service that it is communicatively connected to, FIG. 7 illustrates an intermediary-based group key supplier system 700. In the illustrated example of FIG. 7, the system 500 (e.g., a computing node) is communicatively connected to an example intermediary 702. As described above, the example intermediary may be realized as any type of network appliance, including but not limited to a switch, a router, a gateway, a hub, etc. The example intermediary 702 includes an example group key supplier 704, which may be realized herein as a database, one or more storage elements, memory, cache, etc. In some examples, the data movement circuitry 600 (or parts/components thereof) are located in the example intermediary 702 to instantiate key lookup activities. For example, the intermediary based interface circuitry 602 may instantiate and/or otherwise query the example group key supplier 704 to provide and/or otherwise obtain a corollary group key to/for the example accelerator circuitry 510. Generally speaking, corollary group keys, when created for a given combination of TEEs (e.g., TEE identifiers), accessors (e.g., accessor identifiers), objects (e.g., object identifiers) and corresponding hidden keys, are immutable.

In other words, the corollary group keys can only be revoked or provisioned, but cannot be modified. As such, the example group key supplier 704 of FIG. 7 needs only to be treated as an insert/delete/lookup cache that operates as an interface to the IBPKE service, thereby reducing computational and bandwidth burdens of the system 500 of FIGS. 5 and 7. In other words, the example system 500 no longer needs to operate as a front end service to the IBPKE service and, instead, can focus on unwrapping of corollary group keys received and/or otherwise retrieved from a localized group key supplier 704.

Figure 8:
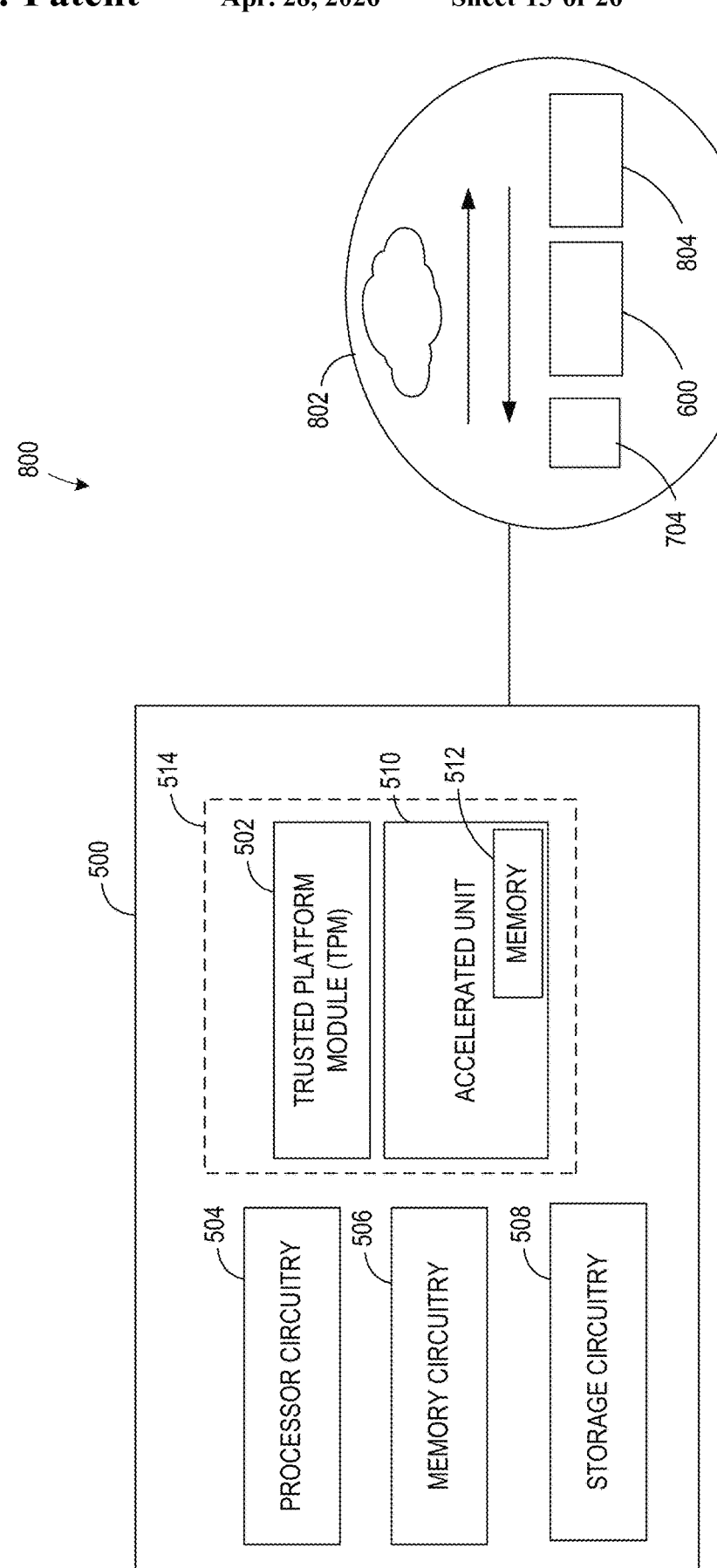
FIG. 8 is a schematic diagram of an example intermediary-based group key wrapping system constructed in accordance with teachings of this disclosure.

In some examples disclosed herein, additional computational responsibilities are provisioned on/by the example intermediary 702. FIG. 8 illustrates an example intermediary-based group key wrapping system 800. The illustrated example of FIG. 8 has several similarities to the illustrated example of FIG. 7, which are represented with the same reference numbers. However, the example system 500 of FIG. 8 no longer requires the example data movement circuitry 600, which is now part of example intermediary 802. The example intermediary 802 of FIG. 8 includes the example data movement circuitry 600 and an example intermediary (e.g., switch) accelerator 804. As such, corollary group keys are now supplied to the intermediary 802 instead of being supplied to the system 500, thereby reducing additional computational burdens on the example system 500. The illustrated example of FIG. 8 effectively splits the in-band traffic from a requestor to a caching server (e.g., the example group key supplier 704) as a simple TLS/DTLS between the requestor and the caching server. The example intermediary accelerator 804 implements an in-the-flow capability to decrypt an object (K) and to send the decrypted data (e.g., cleartext) using a protocols such as IPSec directly to an end/requestor accelerator (e.g., accelerator 510).

Several benefits result from the illustrated example of FIG. 8. First, the requestor accelerator 510 can be purpose focused instead of shouldering the burden of key-unwrapping efforts. As such, the example requestor accelerator 510 need only support IPSec to facilitate a secure manner of receiving the work product of the example intermediary 802. Second, the requestor accelerator 510 does not need to be trusted beyond the trust that is already represented by the corollary group key of the particular TEE-and-object-and-requestor combination.

In some examples, the example data movement circuitry 600 may be located in the example system 500 and also located in the example intermediary 802. In some examples, the example data movement circuitry 600 is only located on one or the other of the example system 500 or the example intermediary 802. Such diverse possibilities occur in view of the heterogenous nature of Edge networks. As such, the example data movement circuitry 600 determines one or more characteristics of its environment in an effort to facilitate data movement efforts in a more efficient manner than traditional approaches (e.g., approaches disclosed above in connection with FIG. 3 and/or FIG. 4).

In connection with the illustrated example of FIG. 8, the example intermediary detection circuitry 610 determines whether an intermediary-based accelerator is present and, if not, data movement techniques corresponding to example FIG. 5A and FIG. 5B are instantiated. However, in the event the example intermediary detection circuitry 610 determines that an intermediary-based accelerator is present and/or otherwise available in the heterogeneous network (e.g., within an intermediary, such as a switch, a router, etc.), then the group key analysis circuitry 606 instantiates the example intermediary accelerator 804 to create a corollary group key.

In particular, the example group key analysis circuitry 606 gathers corresponding parameters or characteristics to be used in the corollary group key, such as (a) a particular target domain, (b) a particular target accelerator (e.g., a TEE), and (c) a particular requestor. As described above, the aforementioned parameters or characteristics correspond to a corollary group key identifier combination, which is a unique combination of parameters/characteristics for an intended end user, an intended UE and/or an intended UA (e.g., operating/executing within a UE or other node). The example encryption circuitry 612 instantiates the example intermediary accelerator 804 to encrypt and/or otherwise wrap a key corresponding to the target accelerator, and the example IPSec circuitry 614 instantiates the intermediary accelerator 804 to generate a secure tunnel (e.g., using IPSec protocols), and transmits the wrapped key to the accelerator 510. As such, the accelerator 510 (e.g., TEE(B→Accel) now has the ability to unwrap the corollary group key, apply the hidden key to decrypt the object, and transfer the decrypted cleartext into memory to be used in a manner according to objectives of the example system 500.

As discussed above, corollary group keys can be created and dispensed in a dynamic manner to aggregate and dis-aggregate different devices (nodes) that may operate in remote hosts. Such aggregation and disaggregation of devices allows dynamic trusted execution arrangements to be established as needed as a chain of securely onboarded acceleration devices (acceleration circuits) across TEEs as targets. In other words, data that is sent to one or more accelerators or software programs in trusted enclaves (e.g., TEEs) with corollary group keys that are dynamically registered (and dynamically unregistered) at intermediaries, as needed, without incurring significant delays or risk exposure.

FIG. 9 is an example group key table 900 to illustrate generation of foreign identifiers that can be dynamically created as needed. In the illustrated example of FIG. 9, a foreign ID column 902 includes dynamically generated targets that are created/generated as needed so that data can be sent to them as long as the foreign IDs are registered ("mapped") with a corresponding intermediary (e.g., a switch, a router, a gateway, etc.). As such, when a foreign ID from the example foreign ID column 902 is used, it will facilitate a path (by virtue of registration/mapping) through a corresponding proxy identifier of an example proxy identifier column 904.

To illustrate, a network intermediary creates protected virtual sessions that operate between an example first foreign ID ("domain") 402 and an example second foreign ID ("domain") 501. Sessions are mapped from one side (e.g., foreign ID 402) to a group of proxy identities on another side (e.g., foreign ID 501) and vice versa. As such, for two peers that do not know each other ahead of time, the intermediary mints, creates and/or otherwise generates two new transient identities (foreign IDs), such as proxy ID 201 in foreign ID 402 and proxy ID 202 in foreign ID 501. With this example arrangement, an accessor in foreign ID 402 may use the proxy corresponding to proxy ID 201 to request data/computation from foreign ID 501 in the proxy corresponding to proxy ID 202. In this example manner, the intermediary decouples services running in different domains, but still permits dynamic and flexible data sharing/communication. Further, each domain (e.g., the domain corresponding to foreign ID 402 and the domain corresponding to foreign ID 501) notifies various network intermediaries of these dynamically established proxy identities.

The aforementioned dynamic foreign ID creation/mapping is facilitated by the example data movement circuitry 600, in which the example target registration circuitry 616 responds to one or more requests to generate and/or otherwise map a new foreign ID. If so, the example target registration circuitry 616 establishes a particular foreign ID nomenclature, such as those shown in the example foreign ID column 902 of the illustrated example of FIG. 9. In particular, the example target registration circuitry 616 registers a path that registers the foreign ID (target ID) to (a) a proxy identifier, (b) an object authorized to be accessed, (c) a corollary group key and (d) a corresponding hidden key.

However, in some examples the trust relationships registered and/or otherwise mapped above may include different lifetimes. In particular, some relationships may be mapped/fused in a manner that exhibit a permanent duration within the network, while some relationships may exhibit an ephemeral duration. The example target duration circuitry 618 determines whether a selected one of the foreign IDs is to be permanent or associated with a particular duration. In the event a particular domain relationship is deemed ephemeral, then the example target duration circuitry 618 de-registers or otherwise un-maps the particular target ID so that future use is not permitted.

Examples disclosed herein also address challenges associated with objects that change/mutate. In some examples, challenges associated with mutating objects becomes computationally burdensome when those objects grow in size. Examples disclosed herein facilitate a versioning framework to provide mutated objects with a new/updated identity and an ability to protect such newer versions from accesses made cryptographically possible to previous versions with previously dispensed and/or otherwise distributed keys. In other words, in some examples an accessor that may have received data of a first object (K) in an authorized manner, but is not deemed authorized to automatically receive data corresponding to a newer version of the first object (K), such as a second object (K'). In some examples, authorization for the relatively newer second object (K') requires a lookup via different techniques, such as an access control list (ACL).

In the event the base first object (K) is large, and the subsequently mutated second object (K') is built upon that to stay large or become even larger, re-encrypting the object (K) with a new key (E') is both costly (e.g., from a computational point of view) and cumbersome. As such, examples disclosed herein generate a delta version of object (K) as object (δK) that is encrypted with new key (E'). The delta object (δK) is then distributed to caches throughout intermediaries of the network that also have the same base version of object (K) that is encrypted with an original/first key (E).

Accordingly, caches contain base copies encrypted with one key, and delta versions encrypted with different keys. Because an object (K) may get updated/mutated any number of times, a string of keys (key changes) (e.g., E', E'', E''', etc.) permit access to incremental delta versions of the objects (e.g., $\delta_1 K$, $\delta_2 K$, $\delta_3 K$, etc.). Examples disclosed herein manage the changes of the encryption keys in a cache-friendly manner by wrapping them with corollary group keys, where the corollary group keys are specific to individual accessors.

In operation, the example mutation detection circuitry 620 determines whether a first object (K) has mutated and, if so, the example object fragmentation circuitry 622 generates a delta object (δK), which is typically much smaller than the original object (K). The example delta key generation circuitry 624 generates a delta key (E'), and the example encryption circuitry 612 encrypts the delta object (δK) with the delta key (E'). The example encryption circuitry 612 also wraps the delta key (E') based on characteristics associated with the correct unique accessors, and the example data movement circuitry 600 distributes the encrypted delta object (6K) throughout the cache storage locations of the network (e.g., at intermediaries).

Because examples disclosed herein shift particular computational burdens from a node to an intermediary, traffic patterns within the network change. In particular, while in-network computing delay may be increased due to participation of the intermediaries, and node-based flows may decrease, traditional techniques to monitor network health and/or activity may no longer produce helpful and/or otherwise accurate information. In some examples, traditional congestion control mechanisms were only optimized for relatively large or relatively small flows, but were unaware of in-network computing, which reduces the efficacy of such traditional congestion control mechanisms. Additionally, in the event of fault-attack-failure-outage (FAFO) events (e.g., jamming/flooding, erroneous congestion signals due to an active attack or a network misconfiguration) to an underlying infrastructure may aggravate the network further and disrupt efforts to move data in a secure manner. Existing end-host networking-based congestion control mechanisms may not be able to detect potential FAFO events until corresponding packets have traversed the end-to-end (E2E) path from a source host to a destination host. As a result, imminent FAFO events would be detected late and may even remain undetected, thereby compromising network resiliency.

By leveraging telemetry information from within the network intermediaries (e.g., programmable switches, routers, smart NICs, etc.), examples disclosed herein facilitate the building of stochastic models to differentiate imminent jamming congestion as distinguished from normal congestion (e.g., caused by loads/activity). Examples disclosed herein facilitate in-network rate computing and feedback generation to infer congestion and trigger dynamic isolation of flows (DIF) faster than traditional network approaches. Example network intermediaries may be distributed/duplicated for scale and resiliency, such as by facilitating a two-level hash in a cluster of intermediaries where a first level hash directs a request to one of the intermediaries, and a second level hash performs a K-V (key-value) lookup, which can be programmed to dynamically activate alternate routes depending on the spread of FAFO events. Intermediaries can scale to support large amounts of data to guarantee the processing for the K-V lookup resides on the intermediaries, thereby avoiding any need to wake-up a host along the path.

Examples disclosed herein employ in-band network-telemetry enabled monitoring circuitry to perform closed loop in-network telemetry (INT) on a periodic or on-demand basis. Such INT efforts facilitate an ability to detect unexpected network issues. Examples disclosed herein apply stochastic models where parameters are updated based on flow arrival and/or flow rate information to determine whether such parameters (e.g., mean, variance, etc.) show particular departures from threshold values. Generally speaking, network loads are usually subject to statistical admission control and service rates, thus distributions at different network components cannot change dramatically from exponentially weighted moving window averages. As such, large scale departures in the parameters typically indicate malicious factors.

Figure 10:
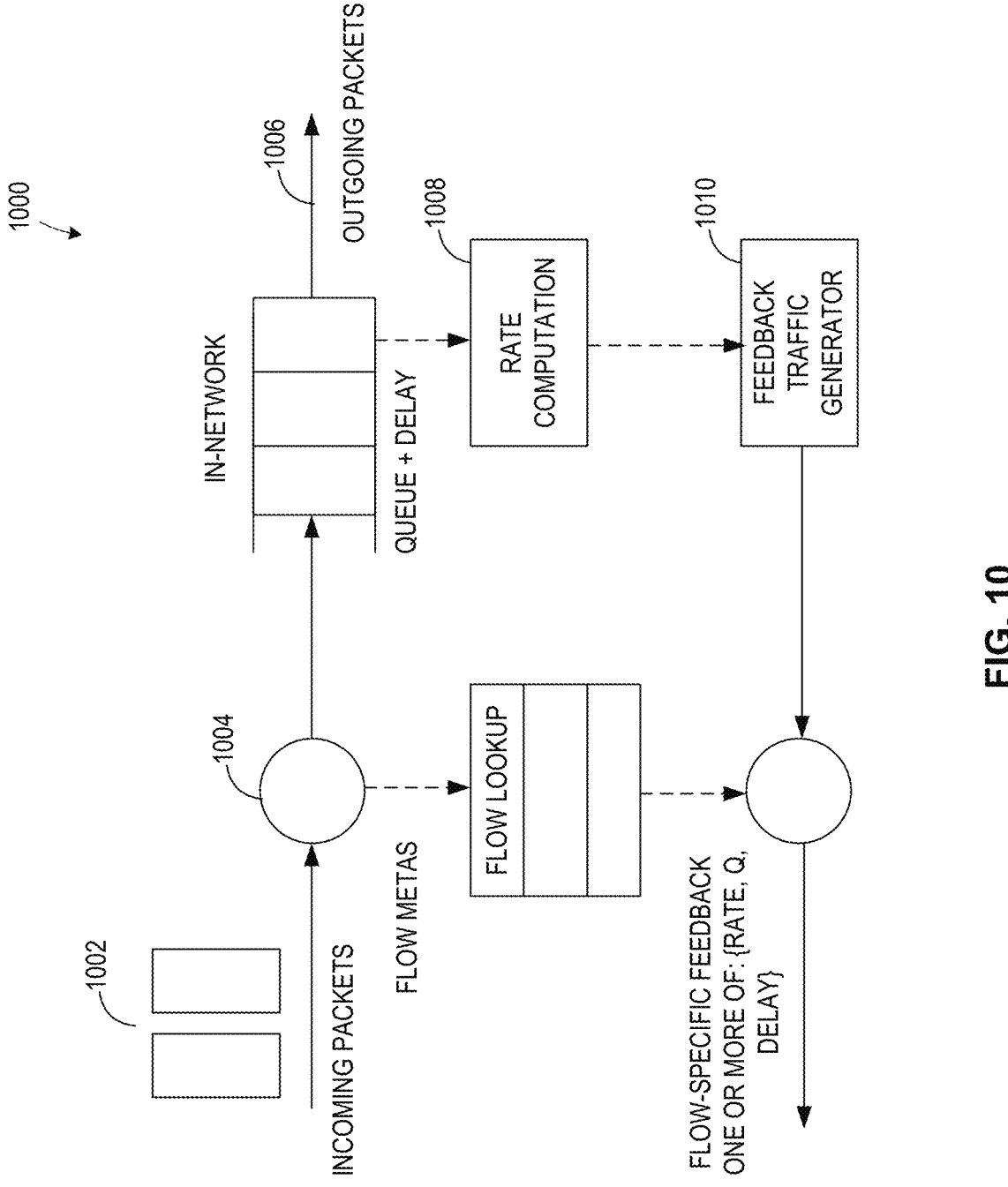
FIG. 10 illustrates an example intermediary monitoring framework constructed in accordance with teachings of this disclosure.

FIG. 10 illustrates an example intermediary monitoring circuitry framework 1000. In the illustrated example of FIG.

10, the framework 1000 represents data flow at an intermediary and includes incoming packets 1002. An example first analysis stage 1004 can parse any flow labels that might be present on the incoming packets to assist with packet flow management (e.g., packet isolation, suppression, timestamp information, etc.). The example incoming packet 1002 propagates to an example output of outgoing packets 1006, but before doing so the example framework 1000 analyzes the packets in an effort to perform rate computation 1008. As described in further detail below, the framework 1000 provides rate computation 1008 information as feedback 1010 to facilitate one or more flow control measures, such as speeding-up a flow rate or slowing-down the flow rate, as needed. Such management operations facilitate the prevention of overflow conditions where the network intermediary can become inundated with incoming packets and unable to process in an effective manner.

Figure 11:
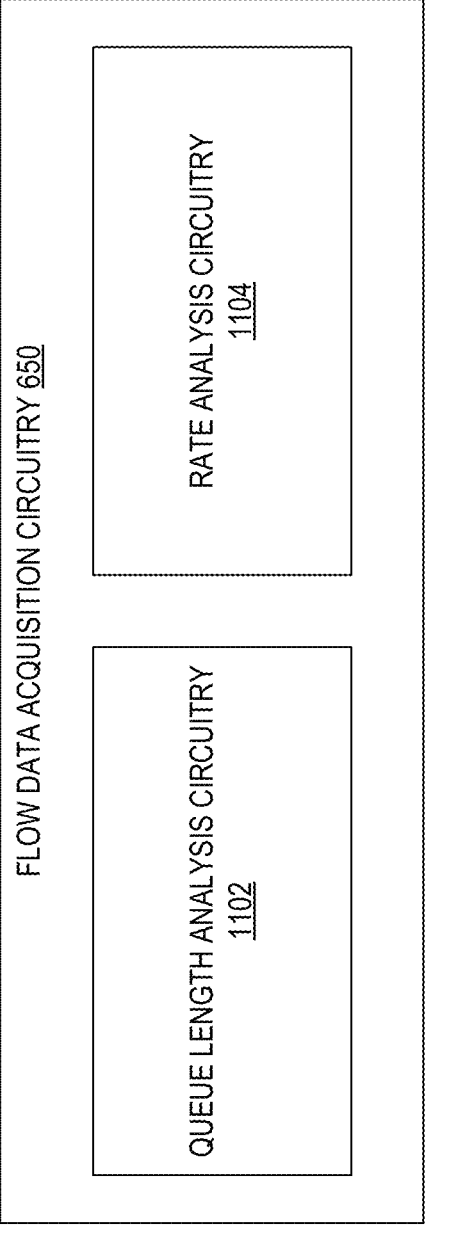
FIG. 11 is a schematic diagram of example flow data acquisition circuitry constructed in accordance with teachings of this disclosure.

As discussed above, in some examples the data movement circuitry 600 includes flow data acquisition circuitry 650. FIG. 11 illustrates example flow data acquisition circuitry 650 that includes example queue length analysis circuitry 1102 and example rate analysis circuitry 1104. In operation (e.g., based on the example framework 1000), the example flow data acquisition circuitry 650 acquires two or more queue samples of data flow behavior at/from the intermediary. The example queue length analysis circuitry 1102 determines if a current queue length (Q(t)) is greater than a maximum queue length value (Q_max). If not, then adjustments to a flow rate at the intermediary are not believed to be necessary. However, if the maximum queue length value (Q_max) is detected, then this circumstance is indicative of potential instances of network congestion, which may lead to dropping of packets and/or undesired delays in delivery of packets. Additionally, such dropping or delay effects may further cause service level agreement (SLA) violations and/or violations in quality of service (QoS) guarantees for end users of different services. Accordingly, examples disclosed herein enable improved SLA and/or QoS reliability.

In the event the current queue length is greater than the maximum queue length value, then the example rate analysis circuitry 1104 determines whether a maximum rate threshold has been satisfied. If so, then that particular rate is throttled and/or otherwise constrained to a minimum value to prevent potential overflow conditions from occurring or getting worse. On the other hand, if the maximum rate value has not been satisfied, then the example queue length analysis circuitry 1102 determines whether a queue length difference between a current and prior queue length is greater than a length threshold value. If so, then the example rate analysis circuitry 1104 reduces the current rate of the intermediary by a factor (m). On the other hand, if the difference value is not greater than the threshold, then the example rate analysis circuitry 1102 calculates a rate (to be applied to the intermediary) that is based on a weighted sum of the current state Q(t) and an immediate past state Q(t−1). Again, examples disclosed herein maintain an awareness of queue sizes, which in some circumstances are indicative of imminent network congestion.

To calculate the rate based on the weighted sum, the example rate analysis circuitry 1102 calculates a rate based on example Equation 1.

$$\text{Rate} = \text{Current Rate} - a\{Q(t) - Q(t-1)\} - b\{Q(t-1)\} \qquad \text{Equation 1.}$$

In the illustrated example of Equation 1, a first weighted parameter value (a) and a second weighted parameter value (b) are based on a scaling factor and a link type. Stated differently, the first and second weighted parameter values (a and b) are configurable in view of, for example, different link types. For instance, the first and second weighted parameter values may be set in a manner consistent with example Equations 2 and 3.

$$a = \frac{a'}{Factor}.$$ Equation 2

$$b = \frac{b'}{Factor}.$$ Equation 3

In the illustrated example of Equations 2 and 3, a' and b' represent a link-type factor value. For example, link-type factor values a' and b' may be set to 0.3 and 1.5, respectively, in the event of a first link type having a rated bandwidth of 40 Gbps, or the values may be set to 0.45 and 2.25, respectively, in the event of a second link type having a rated bandwidth of 100 Gbps. Additionally, in the illustrated examples of Equations 2 and 3, Factor represents a scaling value divided by two, in which the scaling value is set based on a current rate value that is less than a maximum rate value and a max scaling value (e.g., a maximum scaling value of 64 when an initial scaling value starts at 2). Stated differently, the example rate analysis circuitry 1104 initiates a scaling test routine that begins with a default scaling integer value (e.g., 2) and multiplies the scaling value by a multiple of two in an iterative manner as long as scaling test conditions are true and/or otherwise maintained. In some examples, as discussed above, the multiples of two with which the scaling integer value is multiplied is capped at the max scaling value, but such multiplication only occurs while the current rate is measured at a value less than a designated maximum rate value. When these scaling test conditions are no longer maintained or true, then the example rate analysis circuitry 1104 calculates the Factor as one-half of the value of the scaling value. With that, the weighted parameter values (a and b) can be calculated in a manner consistent with example Equations 2 and 3. Furthermore, the example rate analysis circuitry 1104 sets the rate value for the intermediary in a manner consistent with example Equation 1 based on the weighted parameter values.

As a result, the example rate analysis circuitry 1104 iteratively, scheduled and/or periodically measures the current rate value (regardless of the attempted setting of the rate) to make sure it is neither above the maximum value nor below the minimum value. If so, then the rate setting corresponding to example Equation 1 is maintained.

Briefly returning to the illustrated example of FIG. 5A, FIG. 6, and FIG. 11, FIG. 5A is a block diagram of an example system 500 to protect data movement across distributed environments, FIG. 6 is example data movement circuitry 600 to facilitate protected data movements across distributed environments, and FIG. 11 is example flow data acquisition circuitry 650 to capture data movement telemetry of intermediaries within the distributed environments. The example system 500, data movement circuitry 600 and flow data acquisition circuitry 650 may be instantiated (e.g., creating an instance of, bring into being for any length of time, materialize, implement, etc.) by processor circuitry such as a central processing unit executing instructions. Additionally or alternatively, the aforementioned structure of FIGS. 5A, 6 and/or 11 may be instantiated (e.g., creating an instance of, bring into being for any length of time, materialize, implement, etc.) by an ASIC or an FPGA structured to perform operations corresponding to the instructions. It should be understood that some or all of the circuitry of FIGS. 5A, 6 and/or 11 may, thus, be instantiated at the same or different times. Some or all of the circuitry may be instantiated, for example, in one or more threads executing concurrently on hardware and/or in series on hardware. Moreover, in some examples, some or all of the circuitry of FIGS. 5A, 6 and/or 11 may be implemented by one or more virtual machines and/or containers executing on the microprocessor.

In some examples, the system 500 (of FIG. 5A, FIG. 7 and/or FIG. 8) is instantiated by processor circuitry executing instructions and/or configured to perform operations such as those represented by the flowcharts of FIGS. 12-17.

In some examples, the systems and/or apparatus include means for processing, means for accelerating, means for moving data, means for interfacing, means for unwrapping, means for analyzing corollary group keys, means for decrypting, means for detecting intermediaries, means for encrypting, means for securing IP traffic, means for registering, means for setting a target duration, means for detecting mutation, means for fragmenting, means for delta key generating, means for acquiring flow data, means for analyzing queue length, and means for analyzing rate. For example, the means for processing may be implemented by the example processor circuitry 504, the means for accelerating may be implemented by the example accelerator circuitry 510, the means for moving data may be implemented by the example data movement circuitry 600, the means for interfacing may be implemented by the example intermediary based interface circuitry 602, the means for unwrapping may be implemented by the example unwrap circuitry 604, the means for analyzing corollary groupkeys may be implemented by the example groupkey analysis circuitry 606, the means for decrypting may be implemented by the example decryption circuitry 608, the means for detecting intermediaries may be implemented by the example intermediary detection circuitry 610, the means for encrypting may be implemented by the example encryption circuitry 612, the means for securing IP traffic may be implemented by the example IP security circuitry 614, the means for registering may be implemented by the example target registration circuitry 616, the means for setting a target duration may be implemented by the example target duration circuitry 618, the means for detecting mutation may be implemented by the example mutation detection circuitry 620, the means for fragmenting may be implemented by the example object fragmentation circuitry 622, the means for delta key generating may be implemented by the example delta key generation circuitry 624, the means for acquiring flow data may be implemented by the example flow data acquisition circuitry 650, the means for analyzing queue length may be implemented by the example queue length analysis circuitry 652, and the means for analyzing rate may be implemented by the example rate analysis circuitry 654. In some examples, the aforementioned circuitry may be instantiated by processor circuitry such as the example processor circuitry 1812 of FIG. 18. For instance, the aforementioned circuitry may be instantiated by the example microprocessor 1900 of FIG. 19 executing machine executable instructions such as those implemented in various blocks of FIGS. 12-17. In some examples, the aforementioned circuitry may be implemented by hardware logic circuitry, which may be implemented by an ASIC, XPU, or the FPGA circuitry 2000 of FIG. 20 structured to perform operations corresponding to the machine readable instructions. Additionally or alternatively, the aforementioned circuitry may be instantiated by any other combination of hardware, software, and/or firmware. For example, the aforementioned circuitry may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the data movement circuitry 600 of FIGS. 5A, 6 and 11 is illustrated in FIG. 6, one or more of the elements, processes, and/or devices illustrated in FIGS. 5A, 6 and 11 may be combined, divided, re-arranged, omitted, eliminated, and/or implemented in any other way. Further, the example trusted platform module (TPM) 502, the example processor circuitry 504, the example memory circuitry 506, the example accelerator circuitry 510, the example accelerator memory 512, the example system 500, the example interface circuitry 602, the example unwrap circuitry 604, the example groupkey analysis circuitry 606, the example decryption circuitry 608, the example intermediary detection circuitry 610, the example encryption circuitry 612, the example IPSec circuitry 614, the example target registration circuitry 616, the example target duration circuitry 618, the example mutation detection circuitry 620, the example object fragmentation circuitry 622, the example delta key generation circuitry 624, the example queue length analysis circuitry 1102, the example rate analysis circuitry 1104, and/or, more generally, the example data movement circuitry 600 of FIGS. 6 and 11, may be implemented by hardware alone or by hardware in combination with software and/or firmware. Thus, for example, any of the example the example trusted platform module (TPM) 502, the example processor circuitry 504, the example memory circuitry 506, the example accelerator circuitry 510, the example accelerator memory 512, the example system 500, the example interface circuitry 602, the example unwrap circuitry 604, the example groupkey analysis circuitry 606, the example decryption circuitry 608, the example intermediary detection circuitry 610, the example encryption circuitry 612, the example IPSec circuitry 614, the example target registration circuitry 616, the example target duration circuitry 618, the example mutation detection circuitry 620, the example object fragmentation circuitry 622, the example delta key generation circuitry 624, the example queue length analysis circuitry 1102, the example rate analysis circuitry 1104, and/or, more generally, the example data movement circuitry 600 of FIGS. 6 and 11, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example data movement circuitry 600 of FIGS. 6 and/or 11 may include one or more elements, processes, and/or devices in addition to, or instead of, those illustrated in FIGS. 5A, 6-8 and/or 11, and/or may include more than one of any or all of the illustrated elements, processes and devices.

Flowcharts representative of example hardware logic circuitry, machine readable instructions, hardware implemented state machines, and/or any combination thereof for implementing the data movement circuitry 600 of FIG. 6 are shown in FIGS. 12-17. The machine readable instructions may be one or more executable programs or portion(s) of an executable program for execution by processor circuitry, such as the processor circuitry 1812 shown in the example processor platform 1800 discussed below in connection with FIG. 18 and/or the example processor circuitry discussed below in connection with FIGS. 19 and/or 20. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 12-17, many other methods of implementing the example data movement circuitry 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 12-17 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 12 is a flowchart representative of example machine readable instructions and/or example operations 1200 that may be executed and/or instantiated by processor circuitry to decrypt a target object within a memory of target domain acceleration circuitry, such as shown in the example system 500 of FIG. 5A. The machine readable instructions and/or the operations 1200 of FIG. 12 begin at block 1202, at which the example intermediary based interface circuitry 602 determines whether a corollary groupkey (X) is received. As disclosed above, the example corollary groupkey (X) may be sent via any lightweight distribution protocol, such as the IBPKE service. While the example IBPKE service is a relatively lightweight protocol that does not substantially burden a bandwidth load of a network, further bandwidth preservation improvements may be realized if a database containing one or more corollary groupkeys is located at the network intermediary, as described above.

Also as disclosed above, the example corollary groupkey (X) is unique to a particular combination of a target object, target domain acceleration circuit identifier (e.g., a hardware signature), and accessor identifier, which protects a hidden key that is necessary to decrypt the target object. The example unwrap circuitry 604 unwraps the corollary groupkey (X) to reveal embedded parameters (block 1204) that, if satisfied, authorizes further unwrapping of that corollary groupkey (X) to reveal the underlying hidden key (e.g., the decryption key for the object of interest). In particular, the example groupkey analysis circuitry 606 unwraps the corollary groupkey (X) if and only if the host (e.g., a node, an intermediary) includes (a) a particular object (K) is found within a memory, (b) a particular hardware fingerprint and (c) a particular accessor identifier (block 1206). If not, the example program 1200 ends. Otherwise, the example unwrap circuitry 604 obtains the hidden key (e.g., decryption key) for the target object of interest (block 1208) and the example decryption circuitry 608 decrypts the target object within a memory of the target domain acceleration circuitry (block 1210) (e.g., within memory 512 of FIG. 5A).

Figure 13:
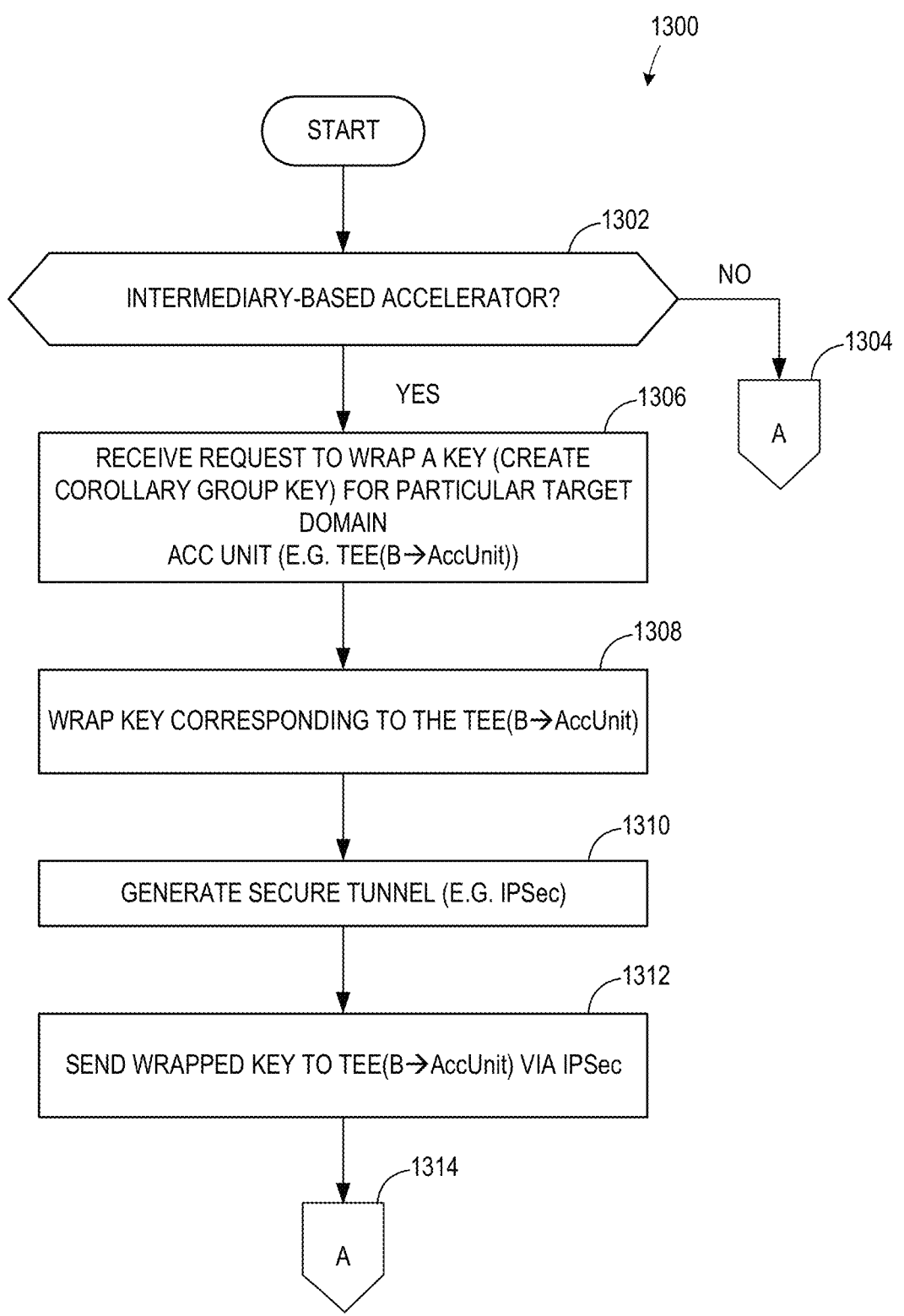

While the example program 1200 of FIG. 12 receives and/or otherwise (a) retrieves corollary groupkeys via any IBPKE service that is communicatively connected thereto or (b) offloads the IBPKE service to an intermediary, program 1300 of FIG. 13 illustrates an example intermediary-based corollary groupkey supplier process. In particular, the example program 1300 of FIG. 13 operates in a manner consistent with example FIG. 8, in which the host 500 is communicatively connected to the example intermediary 702 having the groupkey supplier 704 and the example data movement circuitry 600. In some examples, and in view of the potential heterogeneity of distributed networks, a particular host may include the data movement circuitry 600, or a communicatively connected intermediary may include the data movement circuitry (or both). In an effort to take advantage of efficiency improvements to a particular host, the example intermediary detection circuitry 610 determines whether a current environment or network configuration includes an intermediary-based accelerator (block 1302). For example, in some instances the only available accelerator is structure that is part of a communicatively connected host (see FIG. 7), which depends on an external service to wrap a key intended for that accelerator (so that it can later unwrap the corollary groupkey (X)). In such cases, the program 1300 of FIG. 13 advances to block 1304, which leads to block 1202 of FIG. 12 to accommodate corollary groupkey reception by, for example, the IBPKE service(s).

However, when the example intermediary detection circuitry 610 determines and/or otherwise detects that an intermediary includes its own accelerator (block 1302), such as detection of an intermediary configuration 800 consistent with example FIG. 8, the dependency on any third-party key service is removed and such responsibilities are handled by the accelerator and its corresponding computing resources to aid in the key wrapping task(s). In particular, the example groupkey analysis circuitry 606 receives and/or otherwise retrieves a request to wrap a key (to create a corollary groupkey) for particular target domain acceleration circuitry (block 1306) (e.g., TEE(B→AccUnit), such as the target accelerator 510 of FIG. 8. As disclosed above, mere possession of a particular corollary groupkey does not enable access to the underlying protected hidden key. Instead, the example encryption circuitry 612 wraps a key corresponding to (a) the unique identifiers of the target domain acceleration circuitry, (b) the particular object of interest, and (c) the particular accessor identifiers (block 1308). The example IPSec circuitry 614 generates a secure tunnel between the intermediary 802 and the target accelerator 510 (block 1310), and sends the wrapped key (the corollary groupkey) to the target accelerator 510 (block 1312). Control then advances to block 1314, which further advances to block 1202 of FIG. 12 to allow corollary groupkey unwrapping to occur (thereby enabling access to the hidden key for object decryption).

Figure 14:
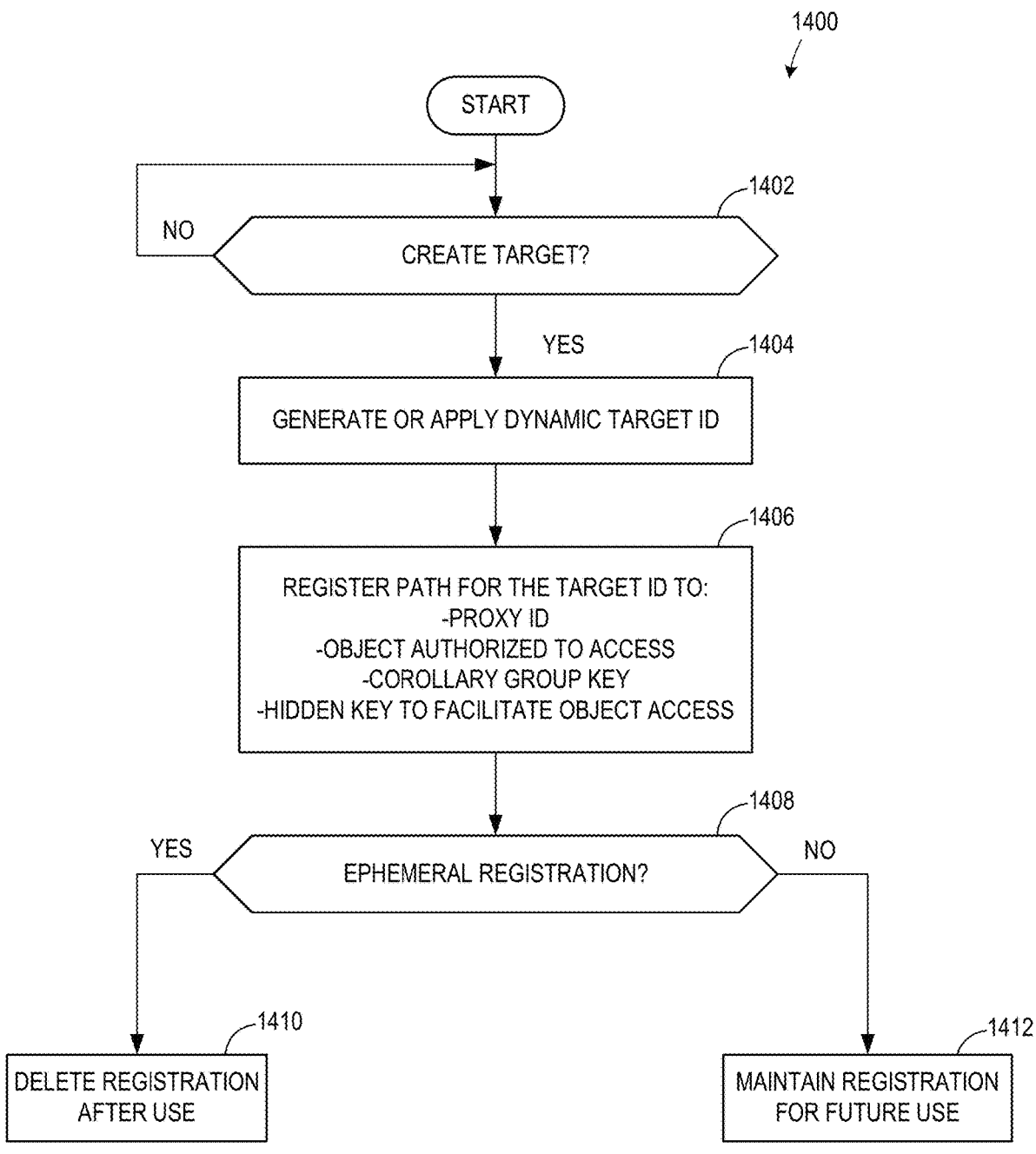

As disclosed above, corollary groupkeys can be created and dispensed in a dynamic manner to aggregate and disaggregate different devices (e.g., computing nodes) that may operate in remote/foreign hosts. FIG. 14 illustrates an example program 1400 to facilitate establishing dynamic trusted execution arrangements as a chain of securely onboarded acceleration devices across TEEs as targets. In other words, the illustrated example program 1400 of FIG. 14 facilitates the generation of foreign identifiers that can be dynamically created as needed. The example target registration circuitry 616 determines whether a request for target creation has occurred (block 1402) and, if so, generates and/or otherwise establishes a dynamic target identifier (block 1404). As discussed above, target identifiers may be established as any type of alphanumeric nomenclature to refer to particular combinations (also referred to herein as "mappings" or "registrations") of particular intermediaries, objects, corollary groupkeys and corresponding hidden keys. In particular, example dynamic target identifiers are illustrated in FIG. 9 as "Foreign ID" 902.

The example target registration circuitry 616 registers and/or otherwise maps a path for the target identifier to a corresponding proxy identifier, an object that is authorized to be accessed, a corollary groupkey, and a corresponding hidden key to facilitate object access (decryption) (block 1406). Because example trust relationships may have different lifetimes (e.g., periods of time for which they are permitted to map), the example target duration circuitry 618 determines a type of registration corresponding to the newly created target identifier (block 1408). In the event the registration is labeled and/or otherwise deemed to be ephemeral (e.g., to last for a finite amount of time), the example target duration circuitry 618 deletes and/or otherwise deregisters the target identifier registration after it has been used or after a threshold amount of time after creation (block 1410). However, in the event the registration is labeled and/or otherwise deemed to function without time and/or usage constraints, the example target duration circuitry 618 allows the target identifier registration/mapping to function in perpetuity (block 1412).

Figure 15:
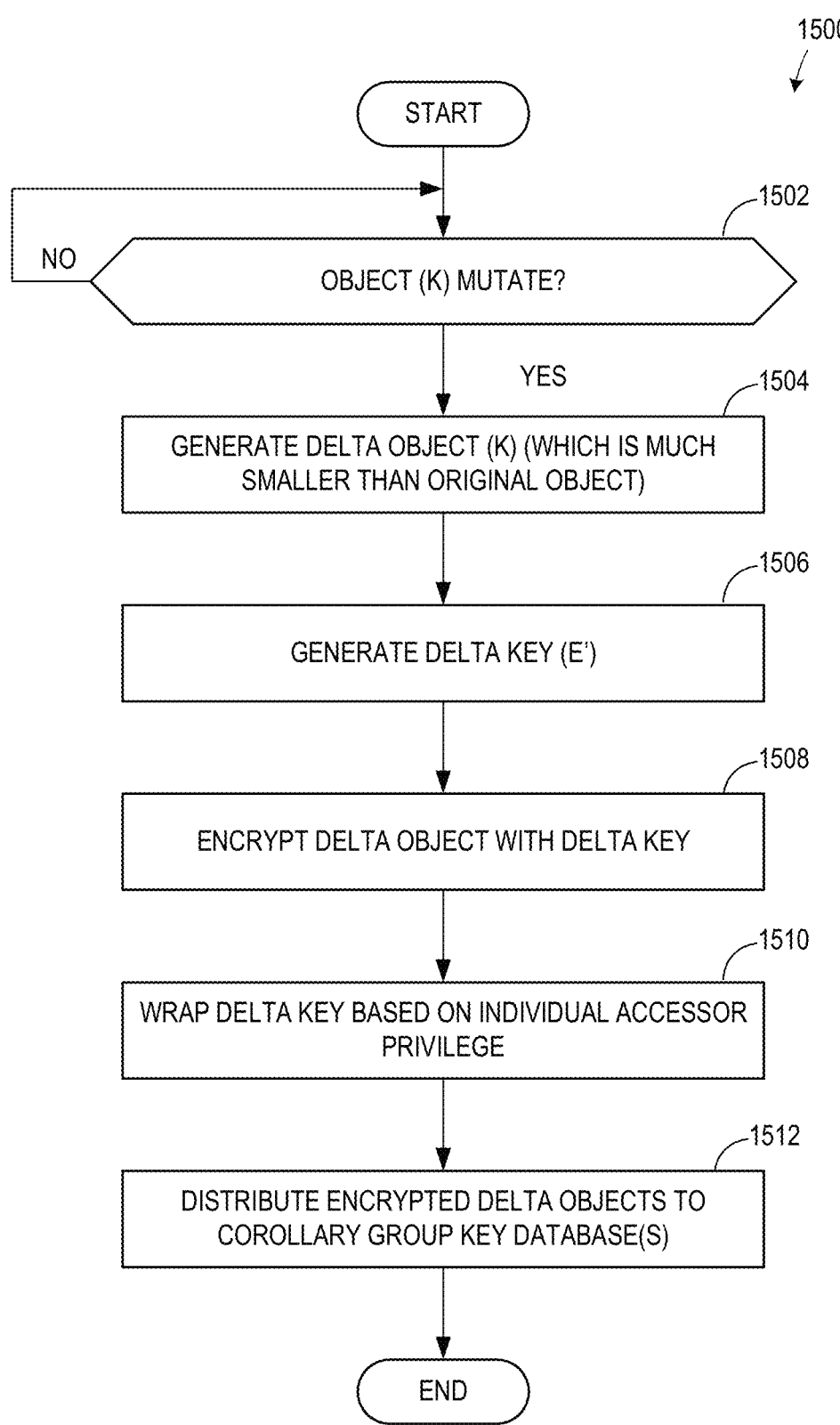

In view of objects that change and/or otherwise mutate, program 1500 of FIG. 15 facilitates a manner of object mutation management. In the illustrated example of FIG. 15, the example mutation detection circuitry 620 determines whether an object (K) (e.g., an original object) has mutated (block 1502), which may have been encrypted (originally) with a first key (E). If mutation has occurred, such as additional information/data has been added to the object (K), then the example object fragmentation circuitry 622 generates a delta object (K') (e.g., a first delta object) (block 1504) that is smaller than the original object (K). Generally speaking, a mutated object is the sum of the parts of the original object (K) and the newly created delta object (K'). At least one helpful reason for creating the example delta object (K') is to reduce network bandwidth and computational resources when sending/receiving objects that may have changed, thereby avoiding the need to send the entire mutated object in response to changes to a relatively smaller part of that original object.

The example delta key generation circuitry 624 generates a delta key (E') that corresponds to the newly created delta object (K') (block 1506), and the example encryption circuitry 612 encrypts the delta object (K') with the delta key (E') (block 1506). The example encryption circuitry 612 also wraps the delta key (E') based on privilege criteria (block 1510) in a manner consistent with corollary groupkey privilege parameters, such as those illustrated in FIGS. 2 and 9. The example data movement circuitry 600 then distributes the encrypted delta objects throughout the distributed network (block 1512), such as by storing them in example group databases or memories of intermediaries.

Figure 16:
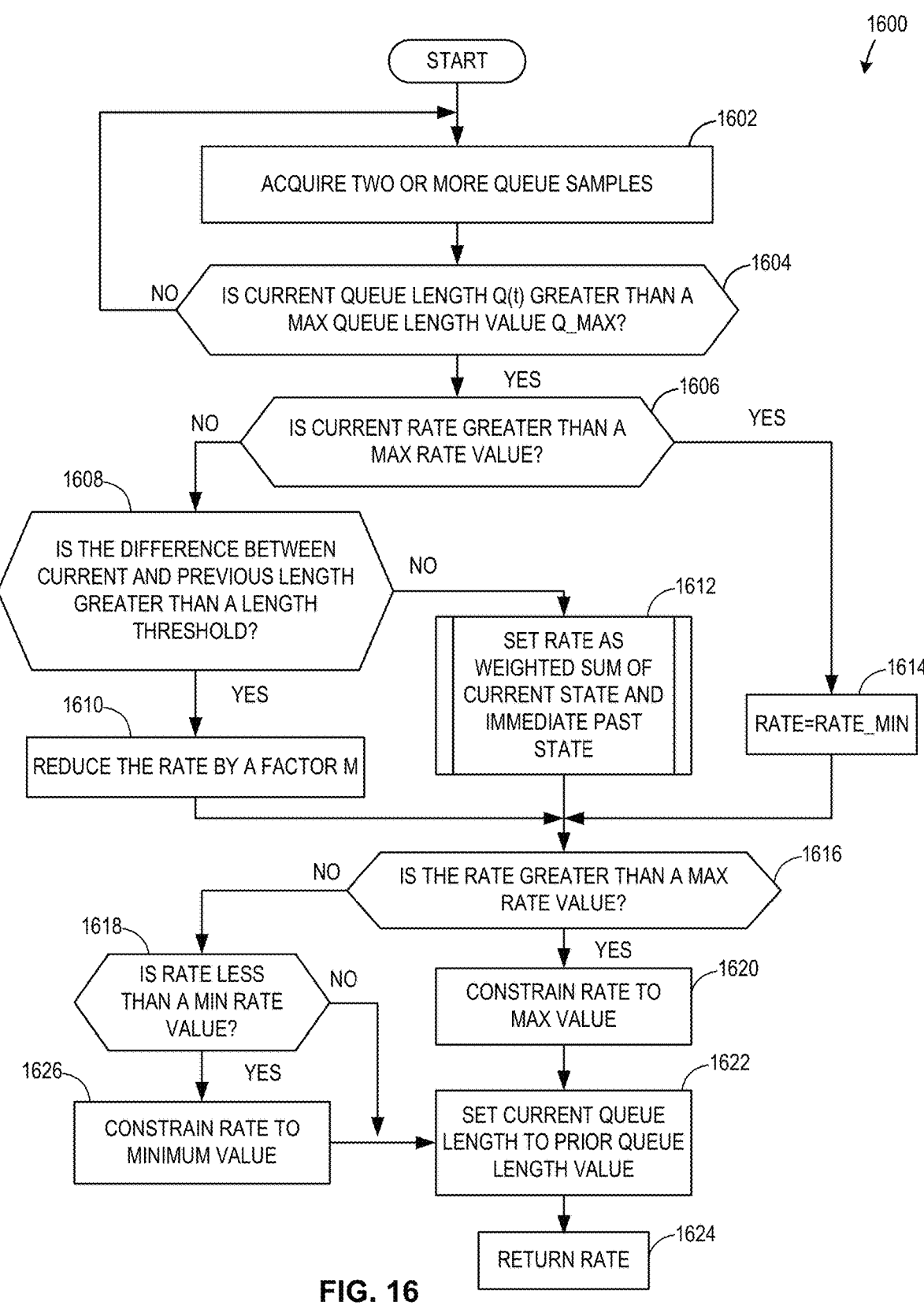

As discussed above, because examples disclosed herein shift particular computational and bandwidth-related burdens from nodes to intermediaries of a distributed network, traffic patterns of the network will change. In particular, the manner of such traffic patterns may no longer be recognizable to typical monitoring techniques regarding indicators of network health and/or activity, which may only focus on node-based parameters/metrics. FIG. 16 is an example program 1600 to monitor distributed network telemetry. In the illustrated example of FIG. 16, the example flow data acquisition circuitry 650 acquires two or more queue samples (block 1602). The example queue length analysis circuitry 1102 determines whether a current queue length Q(t) is greater than a maximum queue length value Q_max (block 1604). As described above, monitoring of queue length values is helpful to determine whether imminent network congestion is likely to occur. In the event of such queue length thresholds being satisfied (e.g., exceeded), undesired effects may occur such as packet dropping and/or packet delay. If not, then the example program 1600 continues to monitor for such a condition. However, if the queue length analysis circuitry 1102 determines that the current queue length Q(t) is greater than a maximum queue length value Q_max, then the example rate analysis circuitry 1104 determines if a current rate value (e.g., a bandwidth rate of the intermediary of interest) is greater than a maximum rate value (block 1606) (e.g., a maximum rate value based on an empirical or theoretical rate capability of the intermediary). If the maximum rate value is exceeded, then the example rate analysis circuitry 1104 sets and/or otherwise constrains a current rate value to a minimum rate value (block 1614) to prevent undesired effects of exceeding the rate capabilities of the intermediary.

However, if the example rate analysis circuitry 1104 determines that the maximum rate value is not exceeded (block 1604), then the example queue length analysis circuitry 1102 determines whether a difference between (a) the current queue length Q(t) and (b) the previous queue length Q(t−1) is greater than a length threshold value (block 1608). In particular, awareness of this difference value is a manner of tracking how the queue length is increasing from one time instance to another, which is helpful to identify imminent congestion. If so, then the example rate analysis circuitry 1104 reduces the current rate value by a factor of m (block 1610). On the other hand, if the example queue length analysis circuitry 1102 determines that the difference value is not greater than the length threshold value (block 1608), then the example rate analysis circuitry 1104 sets a current rate value as a weighted sum of the current state (e.g., a current size of the queue and/or a current size of memory) and an immediate previous state (e.g., a previous size of the queue and/or a previous size of memory) (block 1612), which was described above in connection with example equation 1, and as described in further detail below in connection with FIG. 17.

Figure 17:
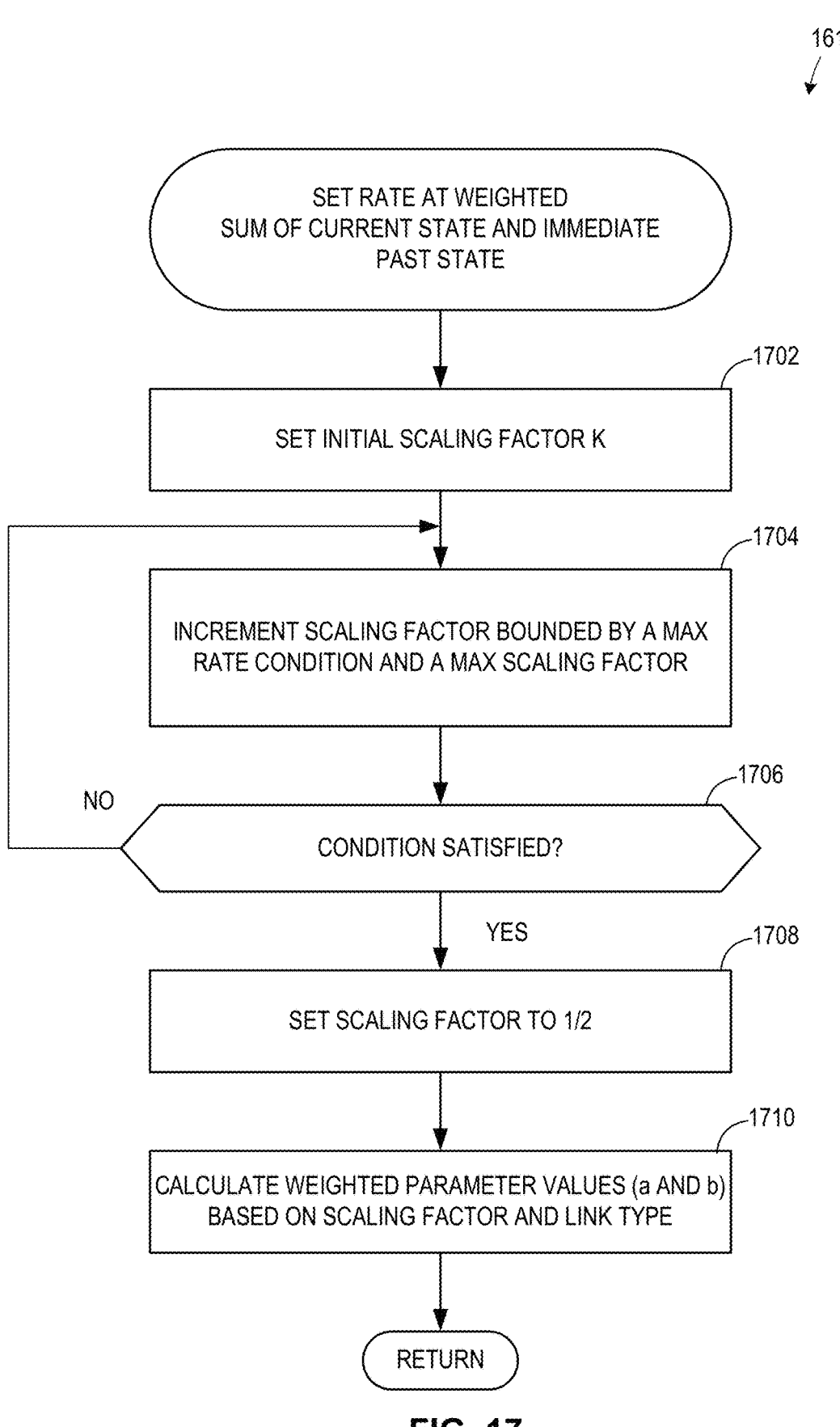

FIG. 17 illustrates additional detail corresponding to block 1612 of FIG. 16 to set the current rate value as the weighted sum of the current state and the immediate previous state (block 1612). In the illustrated example of FIG. 17, the example rate analysis circuitry 1104 sets an initial scaling factor value k (block 1702). In some examples, the initial scaling factor value k is set as a particular (e.g., default) value to initiate convergence. The example rate analysis circuitry 1104 increments or increases (e.g., by a factor of 2) the scaling factor k in an iterative manner based on whether a bounded condition is true (block 1704). In particular, the example bounded condition is based on (a) a current rate value being less than a maximum rate value and (b) a current scaling factor value k being less than a maximum scaling factor value (e.g., less than a scaling factor of 64). If the example rate analysis circuitry 1104 determines that these conditions are not exceeded (block 1706), then the scaling factor increase is iteratively repeated at block 1704.

However, in the event the bounded conditions no longer hold true (block 1706) (e.g., the current rate exceeds a maximum rate value or the current scaling factor value exceeds a maximum scaling factor value), then the example rate analysis circuitry 1104 sets the current scaling factor value k to one-half of its current value, which is referred to as "Factor" (block 1708). To determine the first weighted parameter value (a) and the second weighted parameter value (b) to be used in example Equation 1, the example rate analysis circuitry 1104 applies the value "Factor" in a manner consistent with example Equation 2 and example Equation 3. As such, these values may be used to determine a rate value (Rate) in a manner consistent with example Equation 1 when the example program returns to block 1612 of FIG. 16.

As such, one of three different rate values may result at block 1616. That is, depending on measured conditions, the rate value to be used/set is either (a) the rate value determined as the weighted sum of the current state and the immediate past state (see block 1612 and example Equation 1), (b) a reduced rate by a factor of m (see block 1610), or (c) the minimum rate value (see block 1614). The example rate analysis circuitry 1104 determines whether this particular rate value is greater than the maximum rate value (block 1616) and, if so, the rate is constrained to not exceed that maximum rate value (block 1620). Otherwise, the example rate analysis circuitry 1104 determines whether the rate is less than the minimum rate value (block 1618) and, if so, the rate is constrained to not drop below that minimum rate value (block 1626). Control then advances to block 1622 to set the current queue length Q(t) to the immediate prior queue length value Q(t−1) (block 1622), and the rate value is returned for use and/or otherwise set for the intermediary of interest (block 1624). As a result, the dynamic isolation of flows (DIF) combined with a dynamic adaptation of flows (DAF), the flows of the example intermediary are guaranteed minimum bandwidth and maximum bandwidth (capped), and the throttling of such flows is dynamically updated based on the above process (sometimes referred to as recursive congestion inverse proportioning (RCIP)). The aforementioned processes also enable flow-isolation via packet dropping and/or re-routing of flows to be reported to intermediary management controls (e.g., host controllers) that can quarantine and re-run authentication checks on suspected elements. The aforementioned processes also enable dynamic programming for recovery via control plane states and logs to activate alternate routes depending on fault-attack-failure-outage (FAFO) event types. Generally speaking, programmable network systems disclosed herein may adaptively collect and report partial network states (e.g., with involvement of a control plane) and embed instructions in data packets.

Figure 18:
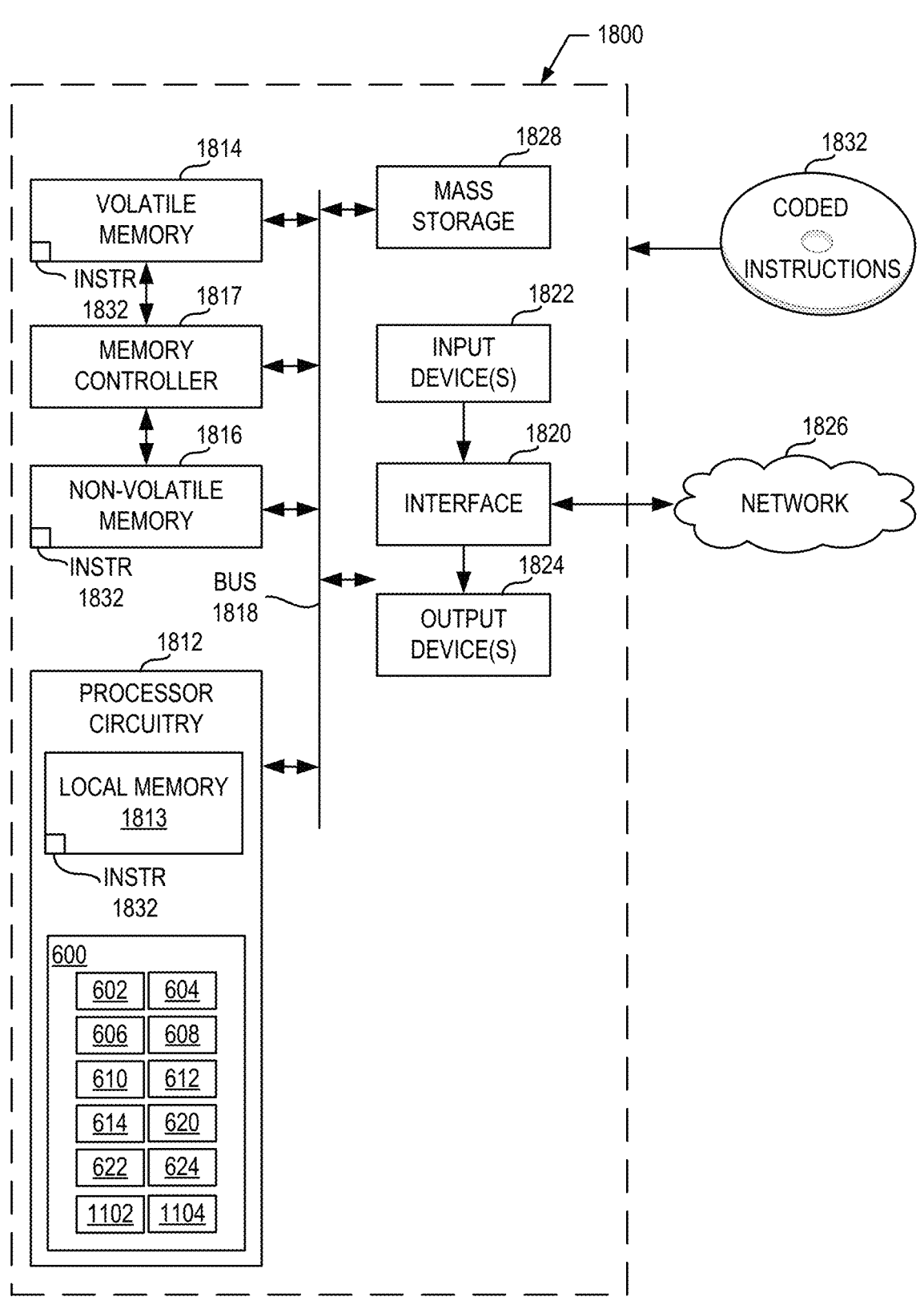
FIG. 18 is a block diagram of an example processing platform including processor circuitry structured to execute the example machine readable instructions and/or the example operations of FIGS. 12-17 to implement the data movement circuitry of FIGS. 6 and 11.

FIG. 18 is a block diagram of an example processor platform 1800 structured to execute and/or instantiate the machine readable instructions and/or the operations of FIGS. 12-17 to implement the data movement circuitry 600 of FIG. 6. The processor platform 1800 can be, for example, a server, a personal computer, a workstation, a self-learning machine (e.g., a neural network), a mobile device (e.g., a cell phone, a smart phone, a tablet such as an iPad™), an Internet appliance, a gaming console, a set top box, a headset (e.g., an augmented reality (AR) headset, a virtual reality (VR) headset, etc.) or other wearable device, or any other type of computing device.

The processor platform 1800 of the illustrated example includes processor circuitry 1812. The processor circuitry 1812 of the illustrated example is hardware. For example, the processor circuitry 1812 can be implemented by one or more integrated circuits, logic circuits, FPGAs, microprocessors, CPUs, GPUs, DSPs, and/or microcontrollers from any desired family or manufacturer. The processor circuitry 1812 may be implemented by one or more semiconductor based (e.g., silicon based) devices. In this example, the processor circuitry 1812 implements the example interface circuitry 602, the example unwrap circuitry 604, the example group key analysis circuitry 606, the example decryption circuitry 608, the example intermediary detection circuitry 610, the example encryption circuitry 612, the example IPSec circuitry 614, the example target registration circuitry 616, the example target duration circuitry 618, the example mutation detection circuitry 620, the example object fragmentation circuitry 622, the example delta key generation circuitry 624, the example queue length analysis circuitry 1102, the example rate analysis circuitry 1104, and/or, more generally, the example data movement circuitry 600 of FIGS. 6 and 11.

The processor circuitry 1812 of the illustrated example includes a local memory 1813 (e.g., a cache, registers, etc.). The processor circuitry 1812 of the illustrated example is in communication with a main memory including a volatile memory 1814 and a non-volatile memory 1816 by a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1816 may be implemented by flash memory and/or any other desired type of memory device. Access to the main memory 1814, 1816 of the illustrated example is controlled by a memory controller 1817.

The processor platform 1800 of the illustrated example also includes interface circuitry 1820. The interface circuitry 1820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1822 are connected to the interface circuitry 1820. The input device(s) 1822 permit(s) a user to enter data and/or commands into the processor circuitry 1812. The input device(s) 1822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1824 are also connected to the interface circuitry 1820 of the illustrated example. The output device(s) 1824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1820 of the illustrated example, thus, typically includes a graphics driver card, a graphics driver chip, and/or graphics processor circuitry such as a GPU.

The interface circuitry 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1800 of the illustrated example also includes one or more mass storage devices 1828 to store software and/or data. Examples of such mass storage devices 1828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1832, which may be implemented by the machine readable instructions of FIGS. 12-17, may be stored in the mass storage device 1828, in the volatile memory 1814, in the non-volatile memory 1816, and/or on a removable non-transitory computer readable storage medium such as a CD or DVD.

Figure 19:
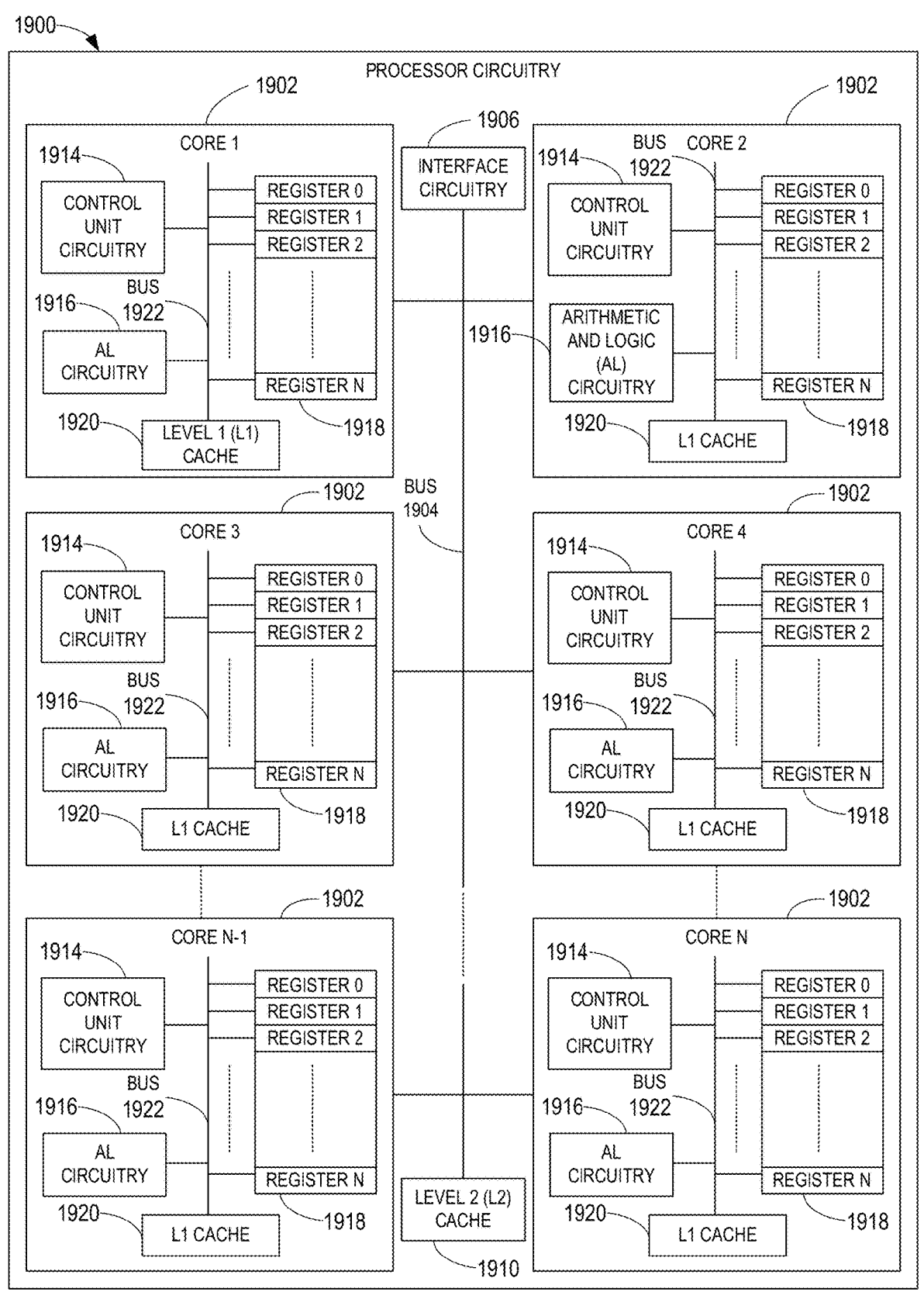
FIG. 19 is a block diagram of an example implementation of the processor circuitry of FIG. 18.

FIG. 19 is a block diagram of an example implementation of the processor circuitry 1812 of FIG. 18. In this example, the processor circuitry 1812 of FIG. 18 is implemented by a microprocessor 1900. For example, the microprocessor 1900 may be a general purpose microprocessor (e.g., general purpose microprocessor circuitry). The microprocessor 1900 executes some or all of the machine readable instructions of the flowchart of FIGS. 12-17 to effectively instantiate the circuitry of FIGS. 6 and 11 as logic circuits to perform the operations corresponding to those machine readable instructions. In some such examples, the circuitry of FIGS. 6 and 11 is instantiated by the hardware circuits of the microprocessor 1900 in combination with the instructions. For example, the microprocessor 1900 may be implemented by multi-core hardware circuitry such as a CPU, a DSP, a GPU, an XPU, etc. Although it may include any number of example cores 1902 (e.g., 1 core), the microprocessor 1900 of this example is a multi-core semiconductor device including N cores. The cores 1902 of the microprocessor 1900 may operate independently or may cooperate to execute machine readable instructions. For example, machine code corresponding to a firmware program, an embedded software program, or a software program may be executed by one of the cores 1902 or may be executed by multiple ones of the cores 1902 at the same or different times. In some examples, the machine code corresponding to the firmware program, the embedded software program, or the software program is split into threads and executed in parallel by two or more of the cores 1902. The software program may correspond to a portion or all of the machine readable instructions and/or operations represented by the flowcharts of FIGS. 12-17.

The cores 1902 may communicate by a first example bus 1904. In some examples, the first bus 1904 may be implemented by a communication bus to effectuate communication associated with one(s) of the cores 1902. For example, the first bus 1904 may be implemented by at least one of an Inter-Integrated Circuit (I2C) bus, a Serial Peripheral Interface (SPI) bus, a PCI bus, or a PCIe bus. Additionally or alternatively, the first bus 1904 may be implemented by any other type of computing or electrical bus. The cores 1902 may obtain data, instructions, and/or signals from one or more external devices by example interface circuitry 1906. The cores 1902 may output data, instructions, and/or signals to the one or more external devices by the interface circuitry 1906. Although the cores 1902 of this example include example local memory 1920 (e.g., Level 1 (L1) cache that may be split into an L1 data cache and an L1 instruction cache), the microprocessor 1900 also includes example shared memory 1910 that may be shared by the cores (e.g., Level 2 (L2 cache)) for high-speed access to data and/or instructions. Data and/or instructions may be transferred (e.g., shared) by writing to and/or reading from the shared memory 1910. The local memory 1920 of each of the cores 1902 and the shared memory 1910 may be part of a hierarchy of storage devices including multiple levels of cache memory and the main memory (e.g., the main memory 1814, 1816 of FIG. 18). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1902 may be referred to as a CPU, DSP, GPU, etc., or any other type of hardware circuitry. Each core 1902 includes control unit circuitry 1914, arithmetic and logic (AL) circuitry (sometimes referred to as an ALU) 1916, a plurality of registers 1918, the local memory 1920, and a second example bus 1922. Other structures may be present. For example, each core 1902 may include vector unit circuitry, single instruction multiple data (SIMD) unit circuitry, load/store unit (LSU) circuitry, branch/jump unit circuitry, floating-point unit (FPU) circuitry, etc. The control unit circuitry 1914 includes semiconductor-based circuits structured to control (e.g., coordinate) data movement within the corresponding core 1902. The AL circuitry 1916 includes semiconductor-based circuits structured to perform one or more mathematic and/or logic operations on the data within the corresponding core 1902. The AL circuitry 1916 of some examples performs integer based operations. In other examples, the AL circuitry 1916 also performs floating point operations. In yet other examples, the AL circuitry 1916 may include first AL circuitry that performs integer based operations and second AL circuitry that performs floating point operations. In some examples, the AL circuitry 1916 may be referred to as an Arithmetic Logic Unit (ALU). The registers 1918 are semiconductor-based structures to store data and/or instructions such as results of one or more of the operations performed by the AL circuitry 1916 of the corresponding core 1902. For example, the registers 1918 may include vector register(s), SIMD register(s), general purpose register(s), flag register(s), segment register(s), machine specific register(s), instruction pointer register(s), control register(s), debug register(s), memory management register(s), machine check register(s), etc. The registers

1918 may be arranged in a bank as shown in FIG. 19. Alternatively, the registers 1918 may be organized in any other arrangement, format, or structure including distributed throughout the core 1902 to shorten access time. The second bus 1922 may be implemented by at least one of an I2C bus, a SPI bus, a PCI bus, or a PCIe bus Each core 1902 and/or, more generally, the microprocessor 1900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 20:
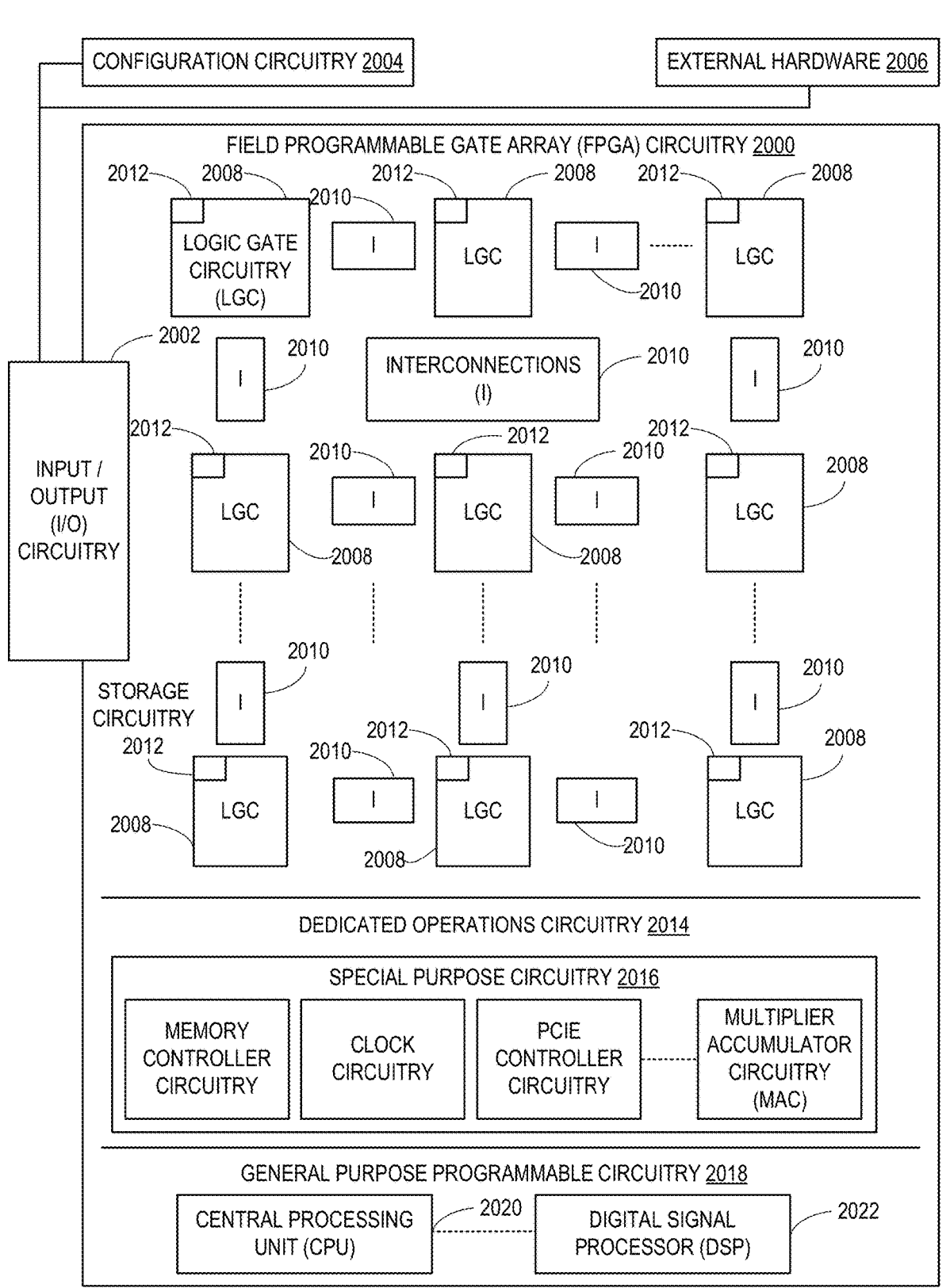
FIG. 20 is a block diagram of another example implementation of the processor circuitry of FIG. 18.

FIG. 20 is a block diagram of another example implementation of the processor circuitry 1812 of FIG. 18. In this example, the processor circuitry 1812 is implemented by FPGA circuitry 2000. For example, the FPGA circuitry 2000 may be implemented by an FPGA. The FPGA circuitry 2000 can be used, for example, to perform operations that could otherwise be performed by the example microprocessor 1900 of FIG. 19 executing corresponding machine readable instructions. However, once configured, the FPGA circuitry 2000 instantiates the machine readable instructions in hardware and, thus, can often execute the operations faster than they could be performed by a general purpose microprocessor executing the corresponding software.

More specifically, in contrast to the microprocessor 1900 of FIG. 19 described above (which is a general purpose device that may be programmed to execute some or all of the machine readable instructions represented by the flowcharts of FIGS. 12-17 but whose interconnections and logic circuitry are fixed once fabricated), the FPGA circuitry 2000 of the example of FIG. 20 includes interconnections and logic circuitry that may be configured and/or interconnected in different ways after fabrication to instantiate, for example, some or all of the machine readable instructions represented by the flowcharts of FIGS. 12-17. In particular, the FPGA circuitry 2000 may be thought of as an array of logic gates, interconnections, and switches. The switches can be programmed to change how the logic gates are interconnected by the interconnections, effectively forming one or more dedicated logic circuits (unless and until the FPGA circuitry 2000 is reprogrammed). The configured logic circuits enable the logic gates to cooperate in different ways to perform different operations on data received by input circuitry. Those operations may correspond to some or all of the software represented by the flowcharts of FIGS. 12-17. As such, the FPGA circuitry 2000 may be structured to effectively instantiate some or all of the machine readable instructions of the flowcharts of FIGS. 12-17 as dedicated logic circuits to perform the operations corresponding to those software instructions in a dedicated manner analogous to an ASIC. Therefore, the FPGA circuitry 2000 may perform the operations corresponding to the some or all of the machine readable instructions of FIGS. 12-17 faster than the general purpose microprocessor can execute the same.

In the example of FIG. 20, the FPGA circuitry 2000 is structured to be programmed (and/or reprogrammed one or more times) by an end user by a hardware description language (HDL) such as Verilog. The FPGA circuitry 2000 of FIG. 20, includes example input/output (I/O) circuitry 2002 to obtain and/or output data to/from example configuration circuitry 2004 and/or external hardware 2006. For example, the configuration circuitry 2004 may be implemented by interface circuitry that may obtain machine readable instructions to configure the FPGA circuitry 2000, or portion(s) thereof. In some such examples, the configuration circuitry 2004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2006 may be implemented by external hardware circuitry. For example, the external hardware 2006 may be implemented by the microprocessor 1900 of FIG. 19. The FPGA circuitry 2000 also includes an array of example logic gate circuitry 2008, a plurality of example configurable interconnections 2010, and example storage circuitry 2012. The logic gate circuitry 2008 and the configurable interconnections 2010 are configurable to instantiate one or more operations that may correspond to at least some of the machine readable instructions of FIGS. 12-17 and/or other desired operations. The logic gate circuitry 2008 shown in FIG. 20 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2008 to enable configuration of the electrical structures and/or the logic gates to form circuits to perform desired operations. The logic gate circuitry 2008 may include other electrical structures such as look-up tables (LUTs), registers (e.g., flip-flops or latches), multiplexers, etc.

The configurable interconnections 2010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2008 to program desired logic circuits.

The storage circuitry 2012 of the illustrated example is structured to store result(s) of the one or more of the operations performed by corresponding logic gates. The storage circuitry 2012 may be implemented by registers or the like. In the illustrated example, the storage circuitry 2012 is distributed amongst the logic gate circuitry 2008 to facilitate access and increase execution speed.

The example FPGA circuitry 2000 of FIG. 20 also includes example Dedicated Operations Circuitry 2014. In this example, the Dedicated Operations Circuitry 2014 includes special purpose circuitry 2016 that may be invoked to implement commonly used functions to avoid the need to program those functions in the field. Examples of such special purpose circuitry 2016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2000 may also include example general purpose programmable circuitry 2018 such as an example CPU 2020 and/or an example DSP 2022. Other general purpose programmable circuitry 2018 may additionally or alternatively be present such as a GPU, an XPU, etc., that can be programmed to perform other operations.

Although FIGS. 19 and 20 illustrate two example implementations of the processor circuitry 1812 of FIG. 18, many other approaches are contemplated. For example, as mentioned above, modern FPGA circuitry may include an on-board CPU, such as one or more of the example CPU 2020 of FIG. 20. Therefore, the processor circuitry 1812 of FIG. 18 may additionally be implemented by combining the example microprocessor 1900 of FIG. 19 and the example FPGA circuitry 2000 of FIG. 20. In some such hybrid examples, a first portion of the machine readable instructions represented by the flowcharts of FIGS. 12-17 may be executed by one or more of the cores 1902 of FIG. 19, a second portion of the machine readable instructions represented by the flowcharts of FIGS. 12-17 may be executed by the FPGA circuitry 2000 of FIG. 20, and/or a third portion of the machine readable instructions represented by the flowcharts of FIGS. 12-17 may be executed by an ASIC. It should be understood that some or all of the circuitry of FIGS. 6 and/or 11 may, thus, be instantiated at the same or different times. Some or all of the circuitry may be instantiated, for example, in one or more threads executing concurrently and/or in series. Moreover, in some examples, some or all of the circuitry of FIGS. 6 and/or 11 may be implemented within one or more virtual machines and/or containers executing on the microprocessor.

In some examples, the processor circuitry 1812 of FIG. 18 may be in one or more packages. For example, the microprocessor 1900 of FIG. 19 and/or the FPGA circuitry 2000 of FIG. 20 may be in one or more packages. In some examples, an XPU may be implemented by the processor circuitry 1812 of FIG. 18, which may be in one or more packages. For example, the XPU may include a CPU in one package, a DSP in another package, a GPU in yet another package, and an FPGA in still yet another package.

Figure 21:
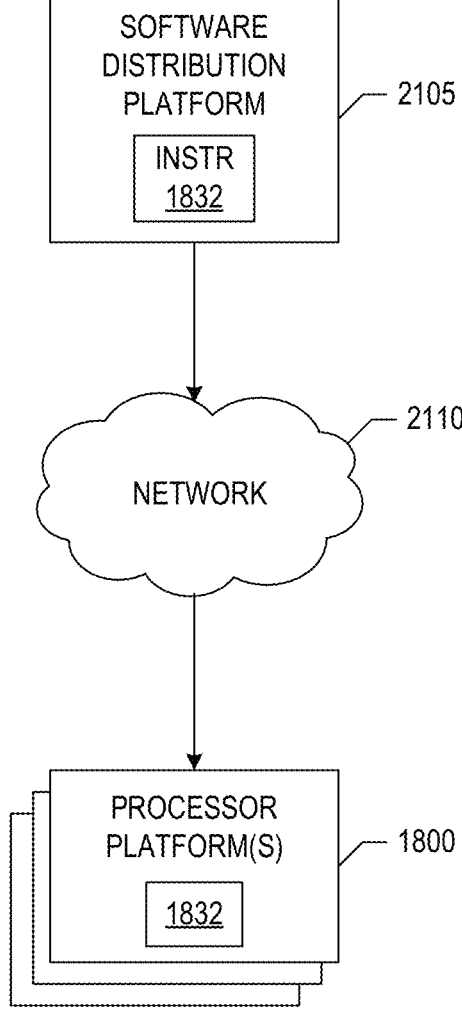
FIG. 21 is a block diagram of an example software distribution platform (e.g., one or more servers) to distribute software (e.g., software corresponding to the example machine readable instructions of FIGS. 12-17) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2105 to distribute software such as the example machine readable instructions 1832 of FIG. 18 to hardware devices owned and/or operated by third parties is illustrated in FIG. 21. The example software distribution platform 2105 may be implemented by any computer server, data facility, cloud service, etc., capable of storing and transmitting software to other computing devices. The third parties may be customers of the entity owning and/or operating the software distribution platform 2105. For example, the entity that owns and/or operates the software distribution platform 2105 may be a developer, a seller, and/or a licensor of software such as the example machine readable instructions 1832 of FIG. 18. The third parties may be consumers, users, retailers, OEMs, etc., who purchase and/or license the software for use and/or re-sale and/or sub-licensing. In the illustrated example, the software distribution platform 2105 includes one or more servers and one or more storage devices. The storage devices store the machine readable instructions 1832, which may correspond to the example machine readable instructions of FIGS. 12-17, as described above. The one or more servers of the example software distribution platform 2105 are in communication with an example network 2110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1832 from the software distribution platform 2105. For example, the software, which may correspond to the example machine readable instructions of FIGS. 12-17, may be downloaded to the example processor platform 1800, which is to execute the machine readable instructions 1832 to implement the examples disclosed herein. In some examples, one or more servers of the software distribution platform 2105 periodically offer, transmit, and/or force updates to the software (e.g., the example machine readable instructions 1832 of FIG. 18) to ensure improvements, patches, updates, etc., are distributed and applied to the software at the end user devices.

From the foregoing, it will be appreciated that example systems, methods, apparatus, and articles of manufacture have been disclosed that reduce computing node burdens in a distributed environment. Examples disclosed herein enable convenient and time-saving pre-established relationships and inter-device authentication prior to exchanging distributed data. In some examples disclosed herein, points of vulnerability on computing nodes are reduced by transferring corollary groupkey generation and/or corollary groupkey storage to intermediaries located within a distributed network. In the event new authorized nodes are to receive access to encrypted objects, examples disclosed herein permit corollary groupkey generation in a manner that specifies particular unique signatures of node accelerators that will be permitted to unwrap specific corollary groupkeys that are only targeting those accelerators that have the matching unique signatures. Disclosed systems, methods, apparatus, and articles of manufacture improve the efficiency of using a computing device by offloading redundant authentication procedures (to intermediaries) that would otherwise be required in a multi-device distributed network. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to protect distributed data are disclosed herein. Further examples and combinations thereof include the following:

Example 1 includes a method of decrypting an encrypted object, comprising parsing, by executing an instruction with processor circuitry, a corollary group key to extract a corollary group key identifier combination, verifying, by executing an instruction with the processor circuitry, a match between the corollary group key identifier combination and a node identifier combination, unwrapping, by executing an instruction with the processor circuitry, the corollary group key to expose a hidden key corresponding to the encrypted object, and decrypting, by executing an instruction with the processor circuitry, the encrypted object with the hidden key.

Example 2 includes the method as defined in example 1, further including identifying an object identifier, a target domain, and an accessor identifier as the corollary group key identifier combination.

Example 3 includes the method as defined in example 2, wherein the object identifier corresponds to the encrypted object.

Example 4 includes the method as defined in example 2, wherein the target domain corresponds to a trusted execution environment (TEE) generated by a trusted platform module (TPM).

Example 5 includes the method as defined in example 2, wherein the target domain corresponds to a computing device, the computing device including a signature.

Example 6 includes the method as defined in example 5, wherein the signature includes a physical uncloneable function (PUF).

Example 7 includes the method as defined in examples 2-6, further including identifying the accessor identifier as at least one of credential information or biometric information.

Example 8 includes the method as defined in examples 1-7, further including verifying the encrypted object is stored in protected memory before exposing the hidden key.

Example 9 includes the method as defined in example 8, further including verifying the protected memory is a trusted execution environment.

Example 10 includes the method as defined in examples 1-7, further including invoking an accelerator of a compute node to unwrap the corollary group key.

Example 11 includes the method as defined in examples 1-7, further including invoking an accelerator of an intermediary to unwrap the corollary group key.

Example 12 includes the method as defined in examples 1-9, further including extracting the corollary group key from an intermediary-based data storage.

Example 13 includes the method as defined in example 12, further including transmitting the hidden key from an intermediary to a compute node corresponding to the node identifier combination via a transport security layer.

Example 14 includes the method as defined in examples 1-9, further including retrieving the corollary group key via an identity based public key encryption (IBPKE) service.

Example 15 includes the method as defined in examples 1-9, further including retrieving the corollary group key via a group key supplier storage.

Example 16 includes the method as defined in examples 1-9, further including dynamically registering corollary group key identifier combinations based on at least one of first domain identifiers and second domain identifiers to facilitate cross-domain access to the encrypted object.

Example 17 includes the method as defined in example 16, further including de-registering at least one of the corollary group key identifier combinations based on a threshold duration.

Example 18 includes the method as defined in examples 1-9, further including detecting a mutated object corresponding to the encrypted object, and generating a mutated hidden key corresponding to the mutated object.

Example 19 includes the method of examples 1-18, wherein the corollary group key is processed by at least one of user equipment (UE) devices, user agents (UAs), compute nodes or network intermediaries.

Example 20 includes One or more computer readable media comprising instructions that, when executed, cause processor circuitry to perform the method of any of examples 1-example 19 includes example 21 includes a computer program comprising the instructions of example 20 includes example 22 includes an Application Programming Interface (API) defining functions, methods, variables, data structures, and/or protocols for the computer program of example 21 includes example 23 includes an apparatus comprising circuitry loaded with the instructions of example example 20 includes example 24 includes an apparatus comprising circuitry operable to run the instructions of example 20 includes example 25 includes an integrated circuit comprising one or more of the processor circuitry of example 20 and the one or more computer readable media of example 20 includes example 26 includes a computing system comprising the one or more computer readable media and the processor circuitry of example 20 includes example 27 includes an apparatus comprising means for executing the instructions of example 20 includes example 28 includes a data unit generated as a result of executing the instructions of example 20 includes example 29 includes the data unit of example 28, wherein the data unit includes at least one of a datagram, a network packet, a data frame, a data segment, a Protocol Data Unit (PDU), a Service Data Unit (SDU), a message, or a database object.

Example 30 includes an apparatus comprising means for performing the method of any of examples 1-20 and/or any other aspect discussed herein.

Additional examples include the following:

Example 31 includes an apparatus to decrypt an encrypted object comprising interface circuitry to facilitate communication with a distributed network, and processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate group key analysis circuitry to parse a corollary group key from the interface circuitry to extract a corollary group key identifier combination, and verify a match between the corollary group key identifier combination and a node identifier combination, unwrap circuitry to unwrap the corollary group key to expose a hidden key corresponding to the encrypted object, and decryption circuitry to decrypt the encrypted object with the hidden key.

Example 32 includes the apparatus as defined in example 1, wherein the group key analysis circuitry is to identify an object identifier, a target domain and an accessor identifier as the corollary group key identifier combination.

Example 33 includes the apparatus as defined in example 32, wherein the object identifier corresponds to the encrypted object.

Example 34 includes the apparatus as defined in example 32, wherein the target domain corresponds to a trusted execution environment (TEE) generated by a trusted platform module (TPM).

Example 35 includes the apparatus as defined in example 32, wherein the target domain corresponds to a computing device, the computing device including a signature.

Example 36 includes the apparatus as defined in example 35, wherein the signature includes a physical uncloneable function (PUF).

Example 37 includes the apparatus as defined in example 32, wherein the group key analysis circuitry is to identify the accessor identifier as at least one of credential information or biometric information.

Example 38 includes the apparatus as defined in example 31, wherein the unwrap circuitry is to verify the target object is stored in protected memory before exposing the hidden key.

Example 39 includes the apparatus as defined in example 38, wherein the protected memory includes a memory within a trusted execution environment.

Example 40 includes the apparatus as defined in example 31, wherein the unwrap circuitry is to unwrap the corollary group key to expose the hidden key in response to verification of a match between the corollary group key identifier combination and the node identifier combination.

Example 41 includes the apparatus as defined in example 40, wherein the unwrap circuitry is to cause an accelerator of a compute node to unwrap the corollary group key.

Example 42 includes the apparatus as defined in example 31, wherein the unwrap circuitry is to cause an accelerator of an intermediary to unwrap the corollary group key.

Example 43 includes the apparatus as defined in example 31, wherein the interface circuitry is to extract the corollary group key from an intermediary-based data storage.

Example 44 includes the apparatus as defined in example 43, wherein the interface circuitry is to transmit the hidden key from an intermediary to a compute node corresponding to the node identifier combination via a transport security layer.

Example 45 includes the apparatus as defined in example 31, wherein the group key analysis circuitry is to retrieve the corollary group key via an identity based public key encryption (IBPKE) service.

Example 46 includes the apparatus as defined in example 31, wherein the group key analysis circuitry is to retrieve the corollary group key from a group key supplier storage.

Example 47 includes the apparatus as defined in example 31, wherein the group key analysis circuitry is to dynamically register corollary group key identifier combinations based on at least one of first domain identifiers and second domain identifiers to facilitate cross-domain access to the encrypted object.

Example 48 includes the apparatus as defined in example 47, further including target duration circuitry to de-register at least one of the corollary group key identifier combinations based on a threshold duration.

Example 49 includes the apparatus as defined in example 31, further including mutation detection circuitry to detect a mutated object corresponding to the encrypted object, and generate a mutated hidden key corresponding to the mutated object.

Example 50 includes an apparatus to propagate an object in a distributed network comprising at least one memory, machine readable instructions, and processor circuitry to at least one of instantiate or execute the machine readable instructions to detect a corollary group key identifier combination from a distributed key, identify a match between the corollary group key identifier combination and a platform identifier combination, extract a second key from the distributed key, the second key associated with the object, and decrypt the object via the extracted second key.

Example 51 includes the apparatus as defined in example 50, wherein the processor circuitry is to cause extraction of an object identifier, a target domain and an accessor identifier from the distributed key.

Example 52 includes the apparatus as defined in example 51, wherein the object identifier is associated with the object.

Example 53 includes the apparatus as defined in example 51, wherein the target domain is associated with a computing device within the platform, the computing device having a signature.

Example 54 includes the apparatus as defined in example 53, wherein the signature is a physical uncloneable function (PUF).

Example 55 includes the apparatus as defined in example 51, wherein the processor circuitry is to cause identification of the accessor identifier as at least one of credential information or biometric information corresponding to a user of a platform.

Example 56 includes the apparatus as defined in example 50, wherein the processor circuitry is to prevent exposure of the second key until after verifying the object is stored in protected memory.

Example 57 includes the apparatus as defined in example 56, wherein the protected memory includes a trusted execution environment (TEE).

Example 58 includes a non-transitory machine readable storage medium comprising instructions that, when executed, cause processor circuitry to at least parse a corollary group key to extract a corollary group key identifier combination, verify a match between the corollary group key identifier combination and a node identifier combination, expose a hidden key corresponding to the target object, and decrypt an encrypted object with the hidden key.

Example 59 includes the non-transitory machine readable storage medium as defined in example 58, wherein the instructions, when executed, cause the processor circuitry to identify an object identifier, a target domain and an accessor identifier as the corollary group key identifier combination.

Example 60 includes the non-transitory machine readable storage medium as defined in example 59, wherein the instructions, when executed, cause the processor circuitry to associate the object identifier with the encrypted object.

Example 61 includes the non-transitory machine readable storage medium as defined in example 58, wherein the instructions, when executed, cause the processor circuitry to associate the target domain with a computing device, the computing device associated with a signature.

Example 62 includes the non-transitory machine readable storage medium as defined in example 58, wherein the instructions, when executed, cause the processor circuitry to identify a physical uncloneable function (PUF) as the signature.

Example 63 includes the non-transitory machine readable storage medium as defined in example 59, wherein the instructions, when executed, cause the processor circuitry to identify the accessor identifier as at least one of credential information or biometric information.

Example 64 includes the non-transitory machine readable storage medium as defined in example 58, wherein the instructions, when executed, cause the processor circuitry to verify the encrypted object is stored in protected memory before exposing the hidden key.

Example 65 includes the non-transitory machine readable storage medium as defined in example 58, wherein the instructions, when executed, cause the processor circuitry to expose the hidden key in response to verification of a match between the corollary group key identifier combination and the node identifier combination.

Example 66 includes an apparatus to transmit objects in a distributed network, comprising memory, machine readable instructions, and processor circuitry to at least one of instantiate or execute the machine readable instructions to generate a corollary group key identifier combination corresponding to a target object, a target domain, and a target accessor, generate a corollary group key by wrapping a hidden key based on the corollary group key identifier combination, generate a secure tunnel to the target domain, and transmit the corollary group key to the target domain via the secure tunnel.

Example 67 includes the apparatus as defined in example 66, wherein the processor circuitry is to generate the corollary group key in response to detecting an intermediary based accelerator in a node of the target domain.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to decrypt an encrypted object comprising:

interface circuitry to facilitate communication with a distributed network;

instructions; and at least one programmable circuit to be programmed by the instructions to:

parse a corollary group key from the interface circuitry to extract a corollary group key identifier combination, the corollary group key identifier combination including an object identifier, a target domain, and an accessor identifier; and verify a match between the corollary group key identifier combination and a node identifier combination;

unwrap the corollary group key to expose a hidden key corresponding to the encrypted object; and decrypt the encrypted object with the hidden key.

2. The apparatus as defined in claim 1, wherein one or more of the at least one programmable circuit is to identify the object identifier, the target domain and the accessor identifier as the corollary group key identifier combination.

3. The apparatus as defined in claim 2, wherein the object identifier corresponds to the encrypted object.

4. The apparatus as defined in claim 2, wherein the target domain corresponds to a trusted execution environment (TEE) generated by a trusted platform module (TPM).

5. The apparatus as defined in claim 2, wherein the target domain corresponds to a computing device, the computing device including a signature.

6. The apparatus as defined in claim 5, wherein the signature includes a physical uncloneable function (PUF).

7. The apparatus as defined in claim 2, wherein one or more of the at least one programmable circuit is to identify the accessor identifier as at least one of credential information or biometric information.

8. The apparatus as defined in claim 1, wherein one or more of the at least one programmable circuit is to verify a target object is stored in protected memory before exposing the hidden key.

9. The apparatus as defined in claim 8, wherein the protected memory includes a memory within a trusted execution environment.

10. The apparatus as defined in claim 1, wherein one or more of the at least one programmable circuit is to unwrap the corollary group key to expose the hidden key in response to verification of a match between the corollary group key identifier combination and the node identifier combination.

11. An apparatus to propagate an object in a distributed network comprising:
at least one memory;
machine readable instructions; and
at least one processor circuit to at least one of instantiate or execute the machine readable instructions to:
    detect a corollary group key identifier combination from a distributed key including an object identifier, a target domain, and an accessor identifier;
    identify a match between the corollary group key identifier combination and a platform identifier combination;
    extract a second key from the distributed key, the second key associated with the object; and
    decrypt the object via the extracted second key.

12. The apparatus as defined in claim 11, wherein one or more of the at least one processor circuit is to cause extraction of the object identifier, the target domain and the accessor identifier from the distributed key.

13. The apparatus as defined in claim 12, wherein the object identifier is associated with the object.

14. The apparatus as defined in claim 12, wherein the target domain is associated with a computing device within the platform, the computing device having a signature.

15. The apparatus as defined in claim 14, wherein the signature is a physical uncloneable function (PUF).

16. The apparatus as defined in claim 12, wherein one or more of the at least one processor circuit is to cause identification of the accessor identifier as at least one of credential information or biometric information corresponding to a user of a platform.

17. The apparatus as defined in claim 11, wherein one or more of the at least one processor circuit is to prevent exposure of the second key until after verifying the object is stored in protected memory.

18. The apparatus as defined in claim 17, wherein the protected memory includes a trusted execution environment (TEE).

19. At least one non-transitory machine readable storage medium comprising instructions that cause at least one processor circuit to at least:
parse a corollary group key to extract a corollary group key identifier combination;
verify a match between the corollary group key identifier combination and a node identifier combination;
verify an encrypted object is stored in protected memory before exposing a hidden key;

expose a hidden key corresponding to the encrypted object; and
decrypt the encrypted object with the hidden key.

20. The at least one non-transitory machine readable storage medium as defined in claim 19, wherein the instructions cause one or more of the at least one processor circuit to identify an object identifier, a target domain and an accessor identifier as the corollary group key identifier combination.

21. The at least one non-transitory machine readable storage medium as defined in claim 20, wherein the instructions cause one or more of the at least one processor circuit to associate the object identifier with the encrypted object.

22. The at least one non-transitory machine readable storage medium as defined in claim 20, wherein the instructions cause one or more of the at least one processor circuit to associate the target domain with a computing device, the computing device associated with a signature.

23. The at least one non-transitory machine readable storage medium as defined in claim 22, wherein the instructions, when executed, cause one or more of the at least one processor circuit circuitry to identify a physical uncloneable function (PUF) as the signature.

24. The at least one non-transitory machine readable storage medium as defined in claim 20, wherein the instructions cause one or more of the at least one processor circuit to identify the accessor identifier as at least one of credential information or biometric information.

25. The apparatus as defined in claim 1, wherein the at least one programmable circuit is implemented by at least one of:
at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations, and one or more registers to store a result of the one or more first operations;
a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations; or
Application Specific Integrated Circuitry (ASIC) including logic gate circuitry to perform one or more third operations.

* * * * *